(12) United States Patent
Shavit et al.

(10) Patent No.: US 8,417,616 B2
(45) Date of Patent: Apr. 9, 2013

(54) PARTICIPATION SYSTEMS AND METHODS

(75) Inventors: Eyal Shavit, Concord, MA (US); Jonathan Cheifetz, Tel-Aviv (IL); Lloyd E. Shefsky, Highland Park, IL (US)

(73) Assignee: AxcessNet Innovations, Lexington, MA (US)

( * ) Notice: Subject to any disclaimer, the term of this patent is extended or adjusted under 35 U.S.C. 154(b) by 0 days.

(21) Appl. No.: 13/368,157

(22) Filed: Feb. 7, 2012

(65) Prior Publication Data

US 2013/0024348 A1 Jan. 24, 2013

Related U.S. Application Data

(63) Continuation-in-part of application No. 12/858,474, filed on Aug. 18, 2010, now Pat. No. 8,112,344, which is a continuation of application No. 12/051,897, filed on Mar. 20, 2008, now Pat. No. 7,805,351.

(60) Provisional application No. 61/542,409, filed on Oct. 3, 2011, provisional application No. 60/896,652, filed on Mar. 23, 2007.

(51) Int. Cl.
*G06Q 40/00* (2006.01)

(52) U.S. Cl.
USPC .......................................... 705/36 R; 705/37

(58) Field of Classification Search ............... 705/35–40
See application file for complete search history.

(56) References Cited

U.S. PATENT DOCUMENTS

| | | | |
|---|---|---|---|
| 6,889,197 B2 * | 5/2005 | Lidow | 705/5 |
| 2002/0032611 A1 * | 3/2002 | Khan | 705/26 |
| 2002/0161679 A1 | 10/2002 | Randolph et al. | |
| 2002/0165726 A1 | 11/2002 | Grundfest | |
| 2006/0111926 A1 | 5/2006 | Welsh et al. | |
| 2006/0190370 A1 | 8/2006 | Halpin | |

* cited by examiner

*Primary Examiner* — Thu Thao Havan
(74) *Attorney, Agent, or Firm* — Occhiuti Rohlicek & Tsao LLP

(57) ABSTRACT

A computer-implemented method and system is used for formation on an electronic exchange of a wide range of contractual relationships between a holder of rights or other assets and acquirers of rights and liabilities associated with such assets based on segregated asset participation units. Such parties to the contractual relationships can equally be individuals or business entities in any combination. Furthermore, in some circumstances, the terms of the contractual relation are defined by a sponsor who defines the terms and in some instances provides or arranges for services that are referenced in the contractual terms.

9 Claims, 17 Drawing Sheets

PARTICIPATION SYSTEMS AND METHODS

CROSS-REFERENCE TO RELATED APPLICATIONS

This application is a continuation-in-part (CIP) application of U.S. Pat. No. 8,112,344, issued on Feb. 7, 2012, which is a continuation application of U.S. Pat. No. 7,805,351, issued on Sep. 28, 2010, which claims the benefit of U.S. Provisional Application No. 60/896,652, filed Mar. 23, 2007. This application also claims the benefit of U.S. Provisional Application No. 61/542,409, filed Oct. 3, 2011. The contents of the above-referenced patents and applications are incorporated herein by reference in their entirety.

BACKGROUND

This invention relates to participation systems and methods.

Parties (e.g., companies or other entities and individuals) can desire to raise capital for various purposes such as financing new or ongoing operation or expenses, financing specific activities, and/or financing purchase of assets. The party seeking to raise capital can raise the capital in a variety of ways.

One way in which companies can raise capital is by issuing equity securities (e.g., stock). A share of stock in a company represents a claim on a proportional share of the company's value which is reflected in the price of the stock. Equity represents an ownership share of the issuer. As such, the value of the stock reflects the assets, the expected operating results, and the perceived risks of the entire entity as a whole.

Companies can also raise capital by taking on debt rather than selling ownership, for example, by borrowing money from banks and other lending institutions or by issuing bonds. A bond does not represent a partial ownership in the issuing company; the bond represents an absolute legal commitment by the company to pay the bondholder in a pre-specified manner. The price of a bond will reflect both the creditworthiness of the issuer as well as the "market risk" relevant to the issuance.

Individuals may raise capital, for instance, through a reverse mortgage on a property, a structured settlement, or sale of an interest in a life insurance policy. However, there are limited parties with whom an individual can form contracts in such examples, and the individual may not have access to sufficient alternatives or be able to select alternatives in a competitive marketplace in which they can obtain commercially attractive terms.

SUMMARY

In one aspect, in general, a computer-implemented method and system is used for formation on an electronic exchange of a wide range of contractual relationships between a holder of rights or other assets and acquirers of rights and liabilities associated with such assets based on segregated asset participation units. Such parties to the contractual relationships can equally be individuals or business entities in any combination. Furthermore, in some circumstances, the terms of the contractual relation are defined by a sponsor who defines the terms and in some instances provides or arranges for services that are referenced in the contractual terms.

In another aspect, in general, the invention features a computer-implemented method for establishing a contractual relationship between two parties based on a segregated contract participation unit, in which the method includes offering to a set of potential investors, on an electronic exchange, a segregated contract participation unit to purchase an economic participatory interest associated with a specific aspect of an issuer operation, and upon purchase of the segregated contract participation unit by a specific investor of the set of potential investors, establishing a contractual relationship between the issuer and the specific investor that binds the issuer to execute a set of obligations according to terms specified in the segregated contract participation unit.

Embodiments of the invention may include one or more of the following features.

The set of potential investors may include one of an open set of potential investors, a restricted set of potential investors, or a specific set of potential investors.

The specific aspect of the issuer operation may include at least one of an activity, asset, or project related to a product or service of the issuer.

The specific aspect of the issuer operation may include at least one of an activity, asset, current or future right, or project related to an operation of the issuer in a particular location.

The computer-implemented method of offering the segregated contract participation unit may include offering the segregated contract participation unit for a specified amount of money or for a commitment for future payments or any other commitment by the acquirer.

The computer-implemented method of offering the segregated contract participation unit may include offering the segregated contract participation unit in exchange for a product or component provided by the purchaser.

The computer-implemented method of offering the segregated contract participation unit may include offering the segregated contract participation unit in full or partial exchange for a service provided by the purchaser.

In general, in another aspect, the invention features a computer-implemented method for managing the generation and sale of segregated contract participation units, in which the method includes receiving a qualified operating agreement from an issuer, the qualified operating agreement specifying an economic participatory interest associated with a specific aspect of an issuer operation and forming the basis for a segregated contract participation unit offered to purchasers, validating the qualified operating agreement, registering the qualified operating agreement on an economic participation market, and providing the segregated contract participation unit based on the qualified operating agreement, wherein the segregated contract participation unit establishes a contractual relationship between the issuer and a purchaser of the segregated contract participation unit.

Embodiments of the invention may include one or more of the following features.

The qualified operating agreement may include information about an activity basis for the segregated contract participation units, and logic for calculating the proceeds payable for each segregated contract participation unit.

The qualified operating agreement may include information about a set of investors eligible to purchase the segregated contract participation units.

The qualified operating agreement may include information about disclosure requirements.

The qualified operating agreement may include information about amendment rules.

The computer-implemented method of validating the qualified operating agreement may include determining whether the qualified operating agreement includes required information.

The computer-implemented method of validating the qualified operating agreement may include determining if the qualified operating agreement is correctly structured.

The computer-implemented method may further include recording information about a purchaser of the segregated contract participation unit in a database.

The computer-implemented method may further include distributing proceeds of the segregated contract participation unit to the holder.

In general, in another aspect, the invention features a computer-implemented method of trading segregated contract participation units that includes accessing, using a computer system, information including one or more of a performance metric and external data related to an activity basis for the segregated contract participation unit, wherein the segregated contract participation unit establishes a contractual relationship between a holder of the segregated contract participation unit and an issuer of the segregated contract participation unit and the activity basis provides an economic foundation for the proceeds payable for the segregated contract participation unit, and trading the segregated contract participation unit on a trading venue by buyers and holders determining a price between the buyer and the seller for the segregated contract participation unit taking into account the information including the one or more of a performance metric and external data.

Embodiments of the invention may include one or more of the following features.

The computer-implemented method may further include receiving information from the issuer of the segregated contract participation unit about the performance metric.

The computer-implemented method may further include recording an executed trade in a computer database.

The computer-implemented method may further include severing a contractual relationship between the seller and the issuer of the segregated contract participation unit subsequent to execution of a trade, and establishing a contractual relationship between the buyer and the issuer of the segregated contract participation unit subsequent to execution of a trade.

The computer-implemented method may further include restricting a set of buyers of the segregated contract participation unit to a limited class of investors.

The computer-implemented method may further include distributing proceeds from the segregated contract participation unit to a holder of the segregated contract participation unit based on a distribution calculation included in a qualified operating agreement associated with the segregated contract participation unit.

Other general aspects include other combinations of the aspects and features described above and other aspects and features expressed as methods, apparatus, systems, computer program products, and in other ways In some embodiments, the economic participation market, qualified operating agreements, and segregated contract participation units issued by an issuer and offered on the economic participation market can create mechanism and marketplace for both private and public companies to raise capital. This method of raising capital allows the capital to be raised according to the specific terms of a contractual participation agreement and available to a universe of participants that is unlimited in its potential size and diversity. Exemplary participants include trading partners, other operating entities, financial investors, and/or speculators.

The economic participation market can provide the advantage of widening the spectrum of alternatives that companies have for raising funds and that investors have for participating in risks and rewards associated with specific economic activities. The financial contracts created and traded on the economic participation market can also provide the advantage of efficiency. It is believed that the segregated contract participation units can be more economically efficient than existing financing methods such as debt and equity stock because their risk, and therefore their pricing, is a function of specific and focused sets of variables.

In another aspect, in general, a computer implemented method establishes a contractual relationship between two parties based on a segregated contract unit. The method includes accepting a registration of a plurality of participation agreements on an electronic exchange, or alternatively, such registrations have already been made and are represented in the electronic exchange. Data characterizing an offer by a first party to form a first plurality of contract units according to a first participation agreement of the plurality of participation agreements in a first role associated with said agreement is accepted on the electronic exchange from the first party of a first set of parties. Each participation agreement specifies a plurality of roles for parties forming contractual relationships according to said agreement. The method involves similarly accepting on the electronic exchange from a second party of a second set of parties data characterizing an offer by the second party to form a second plurality of contract units according to a first participation agreement of the plurality of participation agreements in a second role associated with said agreement. Offers by parties to form contact units according to the first participating agreement in corresponding roles are matched. This matching includes determining whether the data characterizing said offers by said parties represent compatible offers, including determining whether the offer by the first party is compatible with the offer by the second party. Upon matching compatible offers between parties in respective roles associated with the first participation agreement direct contractual relationships are established between said parties, including establishing a contractual relationship between the first party and the second party that binds the said parties to execute a set of obligations according to terms specified in the first participation agreement.

Other features and advantages of the invention are apparent from the following description, and from the claims.

DESCRIPTION

Figure 1:
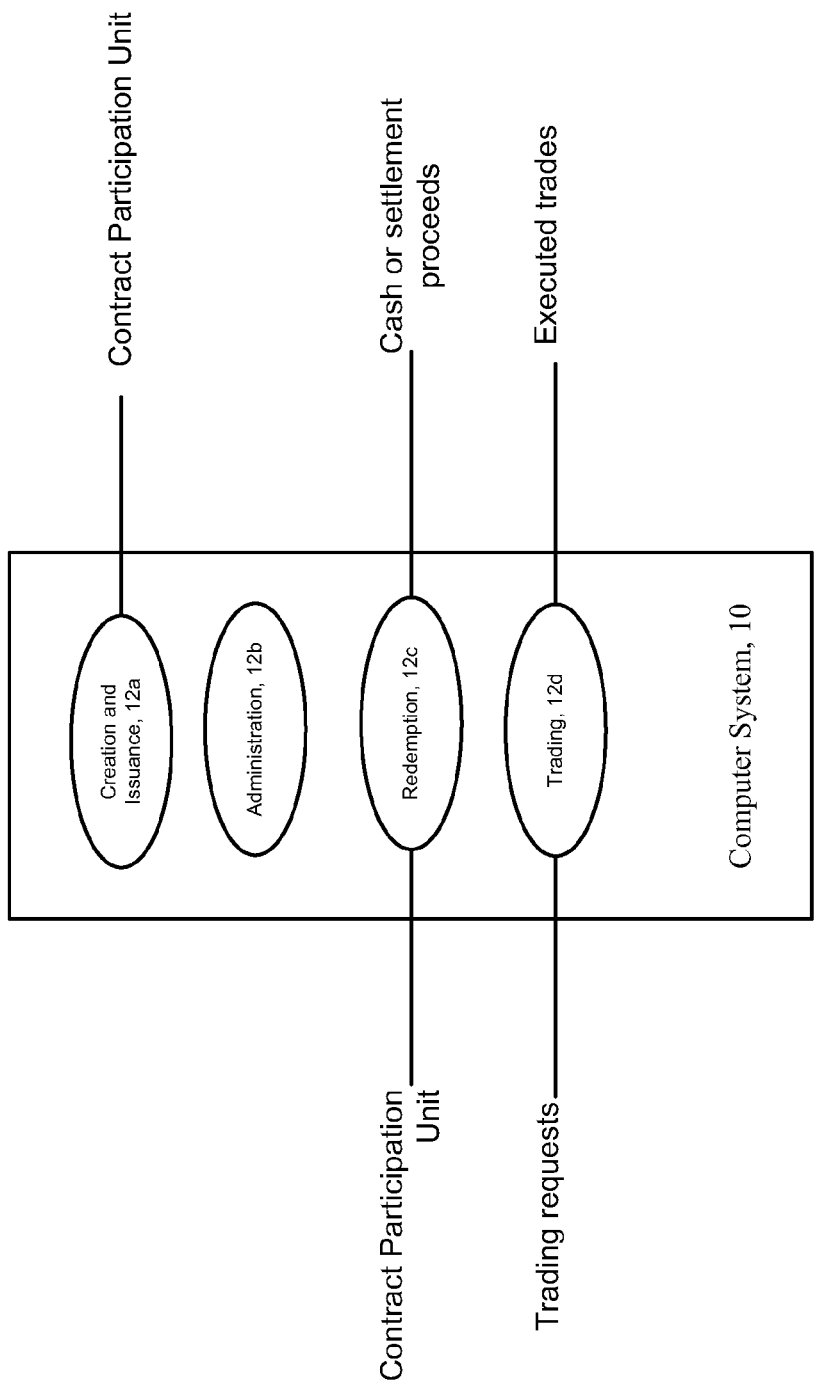
FIG. 1 is a block diagram of a computer system.
Figure 2:
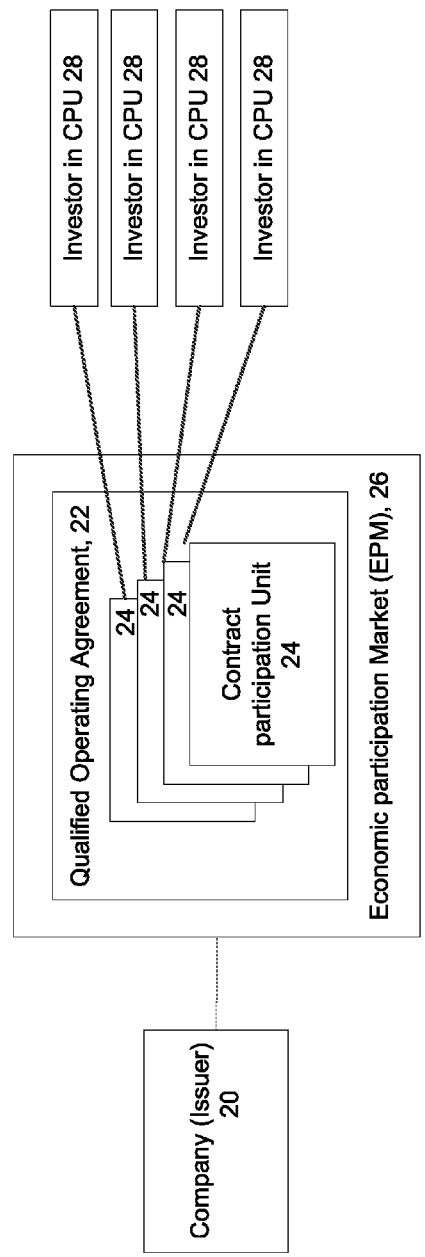
FIG. 2 is a block diagram of an issuer, an economic participation market, and investors.

Referring to FIG. 1, a computer system 10 includes software to assist with creation and issuance 12a, administration 12b, redemption 12c, and trading 12d of segregated contract participation units. Although a single computer system 10 is shown, typically many such systems can be used and indeed each of the software processes can be performed on different computers, controlled by or managed by different entities that are involved in any of the aspects of the segregated contract participation units 1 The Economic Participation Market Referring to FIG. 2, an economic participation market 26 is used to facilitate the creation, issuance, and administration of segregated contract participation units 24. Segregated contract participation units 24 form a contractual relationship between an entity (referred to herein as issuer 20) that issues the segregated contract participation unit 24 and investors in the segregated contract participation units (referred to herein as investors 28) that purchase the segregated contract participation units 24. The formation of this contractual relationship is facilitated by the economic participation market 26. The economic participation market 26 provides central processing engines and communication links between the multiple different participants involved in the generation, sale, and redemption of the segregated contract participation units 24.

The economic participation market 26 provides a market in which corporate entities (e.g., issuer 20) can offer to sell and sell economic participation in specific aspects of an issuer operation to a universe of investors and partners (e.g., investor 28). Examples of aspects of an issuer operation include activities, assets, and/or projects, associated with the issuer 20. The universe of investors and partners can be specified by the issuer 20 and therefore, is not restricted in its potential size and diversity. For example, the issuer 20 could specify that the universe of potential buyers is not restricted and thereby allow any investor to purchase the CPUs. On the other hand, the issuer could place one or more restrictions on who is eligible to purchase the CPUs. As such, the set of investors to which the CPUs are sold can be an open set of investors, a restricted set of investors, and/or a specific set of investors.

An Issuer 20 sells participation in a given aspect of an issuer operation by issuing a set of contractual participation units 24 whose legal and economic rights are tied to a set of the underlying activities, assets and/or projects and are specified in a qualified operating agreement, (QOA) 22. The economic participation market 26 facilitates the issuance of the contractual participation units 24 by the investor as described herein. Investors 28 acquire economic participation in the aspect of an issuer operation by purchasing CPUs 24. The investors 28 can purchase the CPUs 24 from either the Issuer 20 or other holders of CPUs 24 such as distributors, broker/dealers, or individual holders selling part or whole of their position. The purchase of a CPU 24 forms a contractual relationship between the issuer 20 and the investor 28.

In general, the economic participation market 26 provides a market in which the issuers 20 can sell segregated contract participation units 24 to investors 28 (e.g., one in which any registered issuer 20 can sell to any investor 28). The set of investors who can purchase a particular CPU from the issuer can be open, restricted, or specific. For example, an issuer 20 can restrict the size, the type and even the identity of those to which its CPUs 24 will be offered. Restrictions such as these can be specified in the QOA 22.

In addition, the issuer 20 can issue CPUs 24 on any basis (e.g., in contrast to stock where the full valuation of the stock is based on the valuation of some corporate entity or subsidiary thereof). In the economic participation market 26 the basis of a CPU 24 can be any endeavor, activity, project or set of assets that the issuer 20 defines in a QOA 22. As such, the economic participation market 26 facilitates a market in which an issuer 20 can sell participation in any aspect of its operation the issuer 20 desires on a market that is as open or as restricted as the issuer 20 wants it to be.

Figure 3:
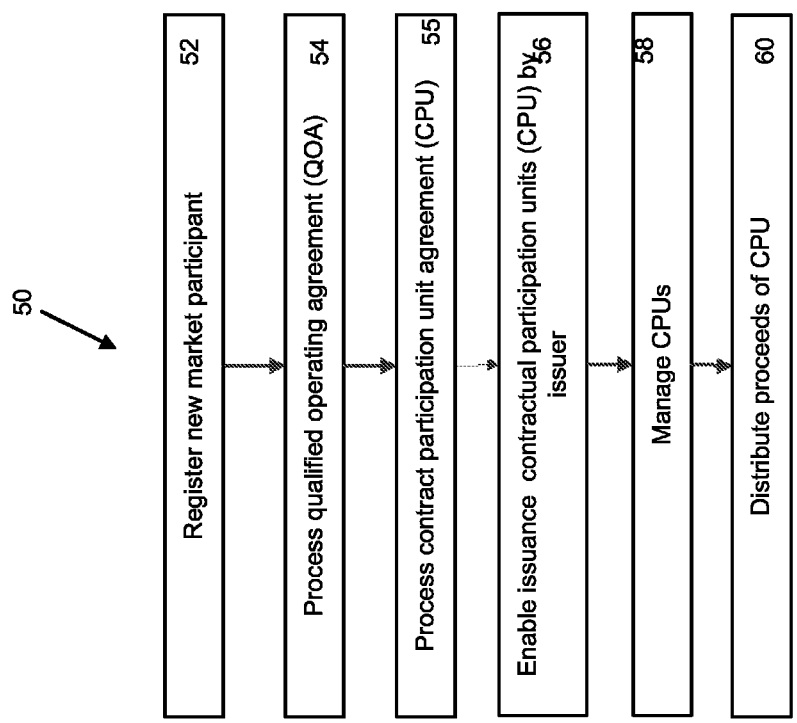
FIG. 3 is a flow chart of a segregated contract participation unit (CPU) generation and management process.

Referring to FIG. 3, a process 50 for managing the formation, administration, and settlement of contracts established based on the segregated contract participation units 24 in the economic participation market 26, each of which will be discussed in more detail to follow. Prior to participating on the economic participation market 26 (e.g., selling segregated contract participation units, purchasing segregated contract participation units, or performing other functions associated with the economic participation market), the economic participation market 26 registers the individual or entity (52). After being registered an issuer 20 can generate and submit QOAs to the economic participation market 26. The economic participation market 26 processes the received qualified operating agreements (54). The issuer 20 also generates and submits CPU agreements to the economic participation market 26 based on a QOA 22 that has been previously processed. The CPU agreement specifies the terms of a CPU issued based on such CPU agreement. The economic participation market 26 processes the received CPUs (55) and allows the issuer to issue segregated contract participation units 24 based on the processed CPU agreement (56). After the issuer 20 (through the economic participation market 26) issues the segregated contract participation units 24, the economic participation market 26 manages the segregated contract participation units 24 (58) and subject to the terms of the qualified operating agreement 22 and the segregated contract participation units 24 collects and distributes proceeds of the segregated contract participation units 24 to the investors 28 (60).

2 Registration

The economic participation market 26 includes a mechanism enabling electronic registration of individuals and entities associated with the economic participation market 26. In general, individuals and entities that transact and/or interact with the economic participation market 26 are registered before engaging in the relevant workflow processes. The economic participation market 26 can require different information depending on participant type. At a minimum, the economic participation market 26 receives a basic set of identity and contact information for the person or entity during the registration process. However, for certain types of market participants, it can be required or beneficial to receive additional information.

For participant types that represent entities with multiple people, a single representative could perform the electronic registration. If necessary or desired, this representative specifies that multiple user accounts should be created, optionally assigning different permissions to the multiple accounts. In addition to the electronic registration, in some embodiments the economic participation market 26 manually interacts with authorized agents to verify identity, obtain notarized signature of legal documents, etc.

Based on the registration process, the economic participation market 26 generates and stores a data record for the participant. The data record can be stored in a database linked to the appropriate data that will be created and processed in the system moving forward—primarily QOAs, CPUs and Disclosure Filings. The economic participation market 26 can assign a set of permissions to an account associated with a participant type. The permissions can allow a particular individual or entity to perform a limited set of tasks on the economic participation market 26. For example, an issuer 20 could have permissions to generate a qualified operating agreement, but not have permission to approve the qualified operating agreement.

3 Processing of Qualified Operating Agreements

As described above in relation to FIG. 3, the economic participation market 26 processes qualified operating agreements and segregated contract participation unit agreements prior to enabling the issuer to issue segregated contract participation units based on the QOAs and CPU agreements. Any company that desires to issue segregated contract participation units in some aspect of an issuer operation authors a QOA and CPU agreements and has them approved by the appropriate review authorities and legal agencies. The economic participation market 26 mandates such a review because once the CPUs are issued, the QOA 22 becomes the binding legal contract between Issuers 20 and investors 28. By completing the QOA 22 and issuing CPUs 24, the issuer 20 legally binds itself to execute a set of obligations in the exact way it specifies in the QOA 22. Investors 28 who have purchased CPUs 24 either directly from an Issuer 20, or indirectly through the secondary market, can refer to the QOA 22 as a binding agreement in the event that they wish to make any claim of breach of contract against the Issuer 20.

The Economic participation market 26 provides the network in which QOAs 22 are registered and made available for review by a potential investor 28. Various participants in the economic participation market 26 are involved in the related workflow processes.

| | |
|---|---|
| Issuers | An Issuer is an entity, either privately or publicly held, that sells CPUs in the economic participation market. A single Issuer can sell multiple sets of CPUs and author multiple QOAs. |
| Investor in segregated contract participation units | An Investor in a segregated contract participation unit is an individual or entity that purchases CPUs in the EPM, either in the primary market as part of a CPU issuance, or in the secondary market. CPUs can be bought directly over the EPM or through a distributor or a Broker/Dealer. |
| CPU Broker/ Dealers | A CPU Dealer is a person or entity who buys and/or sells CPUs in the EPM for his own account. A CPU Broker is an agent who executes orders for CPUs in the EPM on behalf of CPU Dealers and Investor in segregated contract participation units. A CPU Broker/Dealer is simply an entity who acts in both capacities. |
| Review Authorities | A Review Authority is an entity responsible for confirming that the structure and content and disclosures of QOAs meet the requirements set forth by the EPM, before such QOAs are disseminated in the market. |
| Legal Services Providers | A legal service provider is an entity that provides a legal service. The legal services providers can include entities specializing in contract law, as QOAs represent contracts between Issuers and Investors in the segregated contract participation units. |
| Information Providers | An Information Provider is an external entity that provides market data and/or statistical information that Issuers use, in conjunction with internal performance information, to calculate the required distribution of proceeds to Complex CPU Investors as well as general performance metrics of the activity basis of a set of Complex CPUs. Reuters and Bloomberg are examples of Information Providers. |
| Participation Market Analysts | Participation Market Analysts are entities that provide analyses and opinions related to the future performance and pricing of CPUs, both before and after issuance. The consumers of this information include Investor in segregated contract participation units and potential Investor in segregated contract participation units as well as Issuers and other service providers in the EPM. Participation Market Analysts can use mechanisms in the economic participation market for disseminating this information to consumers. |
| Distributor of CPUs | A CPUs Distributor is an entity that provides distribution services for newly issued CPUs by purchasing them from Issuers and selling them to Investor. |
| CPU Transfer Agents | An Issuer can employ a CPU Transfer Agent to act as a registrar for its CPUs, keeping track of the individuals and entities that currently own them and communicating this information to Issuers. CPU Transfer Agents issue electronic certificates of ownership to investors. Additionally, a CPU Transfer Agent can serve as an Issuer's paying agent to distribute proceeds to Investors. |
| Micro-Accounting Services | Micro-Accounting Services collect business transaction information from Issuers electronically over the economic participation market, aggregate, analyze and organize this information and publish it to investors and other relevant parties electronically. These processes are completed in real-time or with a pre-set frequency, giving Investors a transparent view of the performance of their CPUs. |
| Payment and Escrow Services | Payment and Escrow Services process credit card, direct debit and various types of online banking payments electronically over the economic participation market. They are used primarily to accept payments from Investors and transfer funds to Issuers, CPU Distributors and CPU Broker/Dealers upon meeting terms and conditions spelled out in the QOA and CPU agreements. |

Figure 4:
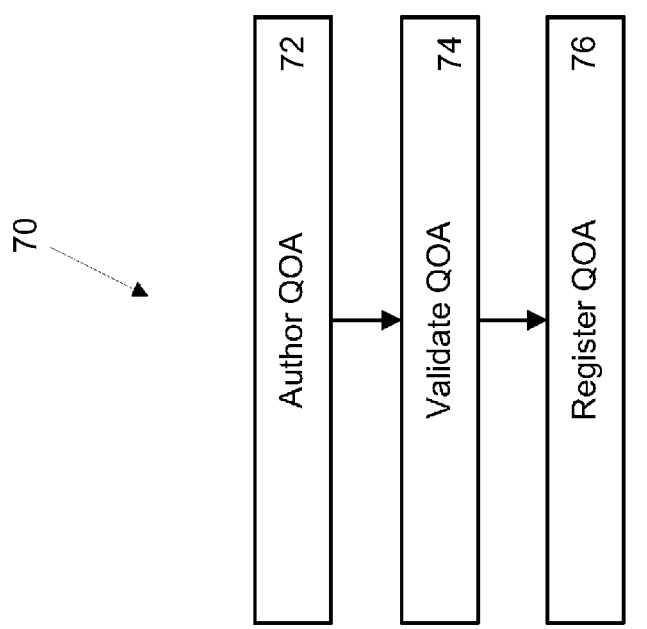
FIG. 4 is a flow chart of a qualified operating agreement (QOA) generation process.

As shown in FIG. 4, a process 70 for processing the qualified operating agreements 22 prior to the issuer 20 issuing segregated contract participation units 24 includes authoring the qualified operating agreement (72), validating the qualified operating agreement (74), and registering the qualified operating agreement (76), each of which will be discussed in more detail herein.

Authoring the qualified operating agreement (72) is completed by the Issuer 20 with the possible help of other entities associated with the economic participation market 26 such as CPU Distributors and Legal Services. For example, CPU Distributors can be employed or engaged by the Issuer 20 to sell the CPUs 24 to investors 28, and to aid in the authorship of the QOA 22 by helping the Issuer 20 construct a calculation methodology that will be used to measure the performance of the activities on which the issuer 20 desires to sell participation. Since the QOA 22 is a contract, legal services providers can be used to help draft the terms of the contract in a manner that protects both the issuer 20 and potential investors 28. Legal services providers can also help to draft the contract in a form suitable to relevant review authorities associated with the economic participation market 26, who are responsible for validating the QOA 22 before it is registered in the economic participation market 26.

In general, there are no limits placed on the universe of activities on which companies can base a QOA and sell participation. For example, a company could sell participation in the performance of a particular branch, a particular region, a particular product, or a particular period of time. The performance can be measured in terms of revenues, profit, grows, or any other measurement clearly defined in the qualified operating agreement 22. However, while the subject matter of the activities on which companies can sell participation is not limited, the economic participation market 26 does provide a pre-defined structure under which the contracts are formed. For example, a sale of participation, which is defined in a QOA 22, includes a specific well defined set of information and/or include a specific set of sections. The set of information or sections can be pre-defined to allow the issuers 20 and investors 28 to clearly determine the content of the contract and their rights and responsibilities pursuant to the contract.

Figure 5:
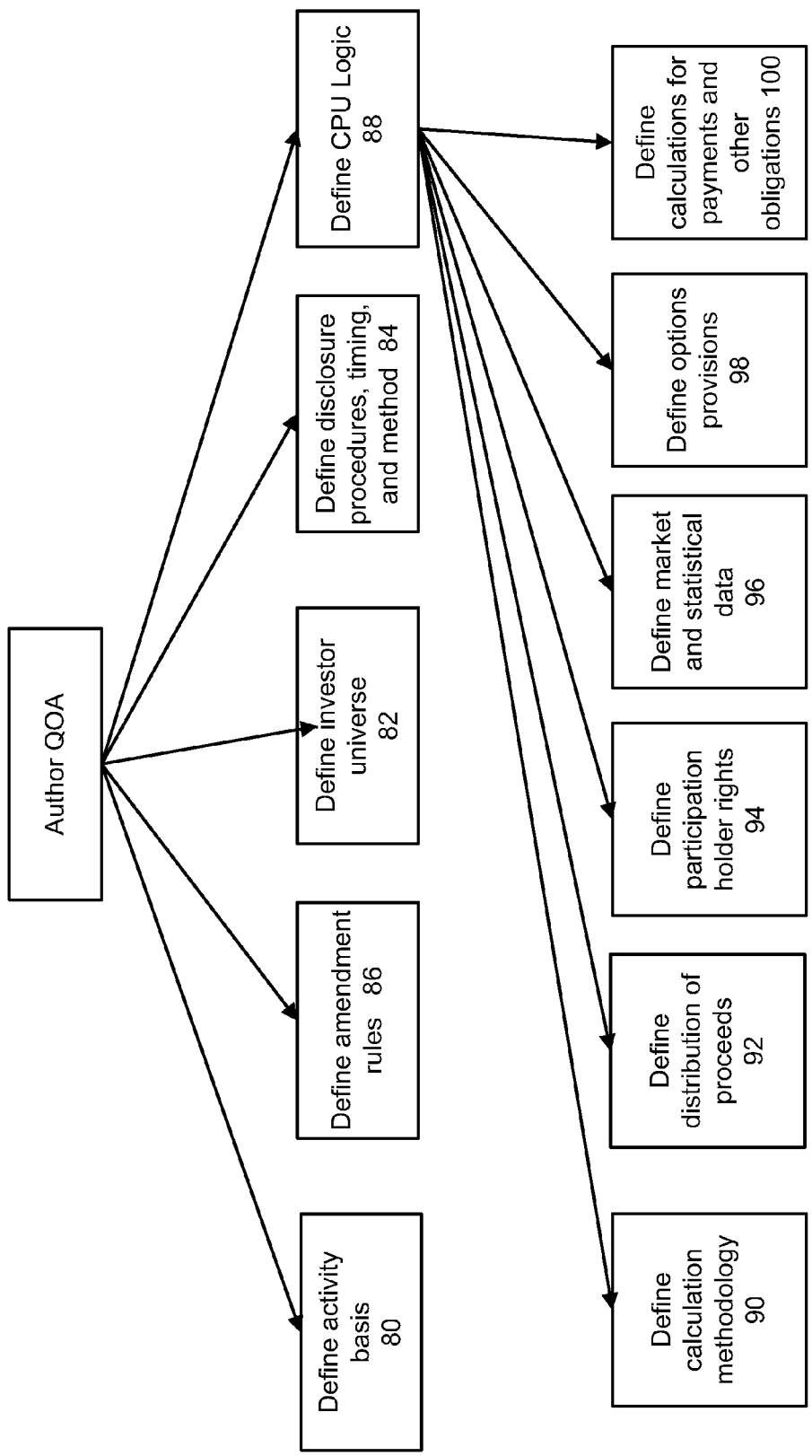
FIG. 5 is a block diagram of QOA authoring activities.

In order to generate a QOA 22, an issuer 20 provides various types of information that form the information and sections of the QOA 22. FIG. 5 shows exemplary actions that the issuer 20 takes to generate the QOA 22, such actions can occur in any order. Activities performed in defining the QOA 22 can include one or more of defining an activity basis (80), defining the investor universe (82), defining disclosure procedures and methods (84), defining rules for amending the QOA (86), and defining CPU logic (88). These actions (e.g., actions 80, 82, 84, 86, and 88) can include one or more sub-actions. For example, defining the CPU logic (88) can include sub-actions such as defining calculation methodology (90), defining distribution of proceeds (92), defining participation holder rights (94), defining market and statistical data (96), defining options provisions (98), and defining conditions and calculations for payments and other obligations (100).

4 Activity Basis

As described above, one activity involved in generating the QOA 22 is to define the activity basis for the QOA 22. An activity basis relates to the aspect of an issuer operation for which the issuer 20 is selling participation. The issuer 20 can sell participation in a wide range of different types of activities, projects and/or assets provided that the issuer 20 defines the details of the relevant activities or assets and delineates the accounting procedures and parameters that will be used to measure performance. The following examples illustrate what is meant here, however, other examples are possible.

For example, a retail company that is set to begin operations in China may wish to sell participation in the China operations. For example, the company could initially plan to open stores in Shanghai but also plan possible expansion into Beijing and other cities. The company could sell participation based on various aspects of this new endeavor. In the section of the QOA 22 in which it defines the Activity Basis, the company (serving as the issuer 20 of participation units) will specify exactly the part of its operations for which it is selling participation. For example, the activity basis would indicate whether the participation include possible future operations in Beijing and other cities, or be limited to only the initial stores in Shanghai. The issuer 20 also defines the accounting procedures and factors that define the economic basis for which it is offering participation—e.g. revenues, gross margins, percentage of gross profits, etc.

In another example, a privately owned Internet company with an advertising-based revenue model may desire to sell participation in its user base. For example, the company (serving as the issuer 20 of participation units) could desire to have the value of the CPUs that it issues be based on to the number of registered or active users without regard to any revenues, profits, etc. that it realizes from such users. Such an activity basis would be possible by specifying in the Activity Basis section of the QOA, exactly what set of users it refers to and how it will measure the relevant statistics, for example, registered users, unique page visitors, etc.

In another example, a consumer products company may desire to sell participation in a new product. For example, the company could desire to have the value of the CPUs that it issues be based on the success of the product. To accomplish such an objective the activity basis could be based on revenue earned from the product. An issuer may be willing to pay a high percentage of specific revenues for a few years with little or no residual rights provided after such initial period. In another example of the use of complex CPUs, a company may commit to pay an amount calculated based on the maximum between its actual earning from a certain activity or the product of its revenues times the average profit margin in its industry. Lastly, a company facing shortage of a critical component for its production line can pay its supplier with cash plus CPUs in return for the valuable components promising a percent of the revenues generated by the end product.

5 Define CPU Logic

As described above, another activity involved in generating the QOA 22 is to define the CPU logic. The CPU logic includes an explanation of the accounting parameters that the issuer 20 will use to establish the economic foundation of the aspect of an issuer operation for which it wishes to sell participation.

The CPU Logic sections include the specific sets of new participation units that the company will issue based on this Activity Basis. There can be a one-to-many relationship between the other sections of the QOA 22 (e.g., the activity basis, the investor in segregated contract participation unit universe, the disclosure requirements, and the amendment rules) and the CPU Logic section because an issuer 20 can issue many types of CPUs 24 for a given activity basis. Allowing a company (e.g., the issuer 20) to generate different types of CPUs based on the same definitions in the other sections can provide the benefit of reducing time and effort for generating different types of CPUs 24. The issuer 20 can issue multiple types of CPUs 24 with the initial registration of the QOA 22 and/or can issue new CPUs 24 once an initial set of CPUs 24 has already been issued. For example, if the issuer 20 finds that a CPU 24 with a particular set of terms is not selling well, the issuer 20 could issue another set of CPUs 24 with differing terms. In addition, the issuer 20 could generate different sets of CPUs 24 with differing terms to target different groups of investors. For example, an issuer 20 could offer a higher return on CPUs that are issued for a longer term or in a greater quantity. In addition, the differing CPUs 24 could provide participation with differing levels of risk.

For example, returning to the example of the retailer selling participation in new operations in China described above, the retailer may issue one set of CPUs related only to initial stores opened in Shanghai, and another set that will also pay proceeds based on any future operations in other cities. The Activity Basis section of the QOA can outline the accounting parameters that will be used as the basis for all stores, and each CPU Logic section will specify the stores relevant to the particular CPU 24. This is one example of how, from a contractual and documentation perspective, the same elements of a QOA 22 can be referenced by multiple CPU Logic sections.

The economic participation market 26 can support multiple types of segregated contract participation units 24. Two exemplary types of segregated contract participation units are basic contractual participation units (BCPUs) and Complex Contractual Participation Units (CCPUs). Basic contractual participation units refer to CPUs for which all performance metrics, calculations of proceeds to investors 28 are derived only from financial information and performance results internal to the issuer 20 and related to the activity basis. In contrast, Complex Contractual Participation Units are CPUs that use external data in addition to financial information and performance results internal to the issuer 20 and related to the activity basis in any related calculations. For example, in a CCPU, a company can include foreign exchange rates in the calculation of distribution of proceeds to investors 28 as well as internal accounting metrics associated with the Activity Basis. External data employed by CCPUs includes data available either publicly or privately to all holders of CPUs. In another example, a company could include the performance of a competitor's stock in the calculation.

As described above in relation to FIG. 5, the action of defining the CPU logic (88) can include sub-actions such as defining calculation methodology (90), defining distribution of proceeds (92), defining participation holder rights (94), defining market and statistical data (96), defining options provisions (98), and defining conditions or calculations for payments and other obligations (100), each of these exemplary sub-actions will be described below.

In defining the CPU logic, the Issuer 20 defines a calculation methodology. The calculation methodology specifies which accounting metrics will be used to calculate any proceeds paid out to investors 28. Such metrics will be used by buyers, sellers, analysts and distributors. Each participant will use its own modeling of risk and value. This section can reference the pieces of the QOA's Activity Basis definition that are relevant to this specific offering of CPUs.

In defining the CPU logic, the issuer 20 defines the distribution of proceeds. Defining the distribution of proceeds includes defining the methodology and frequency of any distribution of income, interest, dividends and/or any other proceeds that it will pay to investors 28 holding the CPUs 24. The issuer 20 also specifies the manner by which such proceeds will be paid; the economic participation market 26 will not necessarily act as the actual channel for distribution, but it will offer data processing services and provide technical communication interfaces to participating Electronic Payment Services.

In defining the CPU logic, the issuer 20 defines the rights of the participation holder. Exemplary rights of the participation holder include whether either the Issuer 20 and/or the investor 28 will have any option to redeem, convert exchange or trade any rights or obligation vested in a segregated contract participation unit. If such options are present, the terms of such options should be defined.

In defining the CPU logic, the Issuer 20 defines Market and Statistical Data that will be used in the calculation of the CPU. For example, if CCPUs are being issued, the issuer 20 specifies the details of the market and/or statistical data it will use to calculate performance metrics and distribution of proceeds. For example, the issuer 20 can specify that it will use the end-of-day mid-market foreign exchange rates as supplied by Reuters or various indexes published by the government, Dow Jones, etc.

In defining the CPU logic, the issuer 20 defines any options provisions. For example, the issuer 20 can add provisions for call or put options on the CPUs 24 being issued to protect itself or the investors. Such options can affect the attractiveness of the segregated contract participation units and their pricing.

In defining the CPU logic, the issuer 20 defines conditions for payments and other obligations of the participation holder 28. For example, the issuer 20 can define a payment schedule or accepted methods of payment. The issuer may give the CPU holder other rights such as first refusal on buying additional CPUs to be issued in the future, discounted prices on buying certain products or services from the issuer etc.

6 Defining the Eligible Investors

In defining the CPU logic, the Issuer 20 also defines the set of individuals or entities that are eligible to be investors in segregated contract participation units (also referred to as the buyer universe). If a person is included in the set of individuals or entities that are eligible to be investors in segregated contract participation units the economic participation market 26 grants access to the QOA 22 to such individual or entity. For example, the issuer 20 can define the individuals or entities that are eligible to be investors 28 to be an unrestricted investor pool such that the QOA 22 will be available for reading and purchase by anyone who has registered in the EPM as an investor 28. On the other hand, issuers 20 can restrict this universe to smaller groups of investors 28 as it sees fit, and different restrictions can apply to different CPU sections within one QOA 22. In some cases the Issuer can retain the right to individually approve each potential investor.

7 Defining the Disclosure Procedures, Timing and Methods

In defining the CPU logic, the issuer 20 defines procedures, timing and methods for disclosures. For example, the issuer 20 can define when and how it will disseminate information related to the economic performance or measurement of the activity basis, as defined in the activity basis definition of the QOA 22. Based on the logic defined in the QOA 22, the economic participation market 26 provides dissemination facilities that allow issuers 20 to file such information and have it securely broadcasted to the relevant public or private audience over the network. No general mandates are made regarding the exact filings that Issuers 20 must produce, with the specific requirements set by the issuer and accepted by a particular Review Authority or Agencies that will review the issuer QOA 22. However, in some embodiments, Issuers 20 may be required to clearly define what and when they commit to disclose in this section of the QOA 22. It is expected that Issuers will undertake frequent disclosures and in some cases will disclose information on a weekly, daily or even real time basis.

8 Defining the Amendment Rules

In defining the CPU logic, the Issuer 20 also defines rules for amending the QOA 22 after CPUs 24 are issued based on the QOA 22. The amendments to the QOA 22 can be restricted to amendments by the issuer 20, amendments by the investors, or both. In addition, the issuer 20 could define the amendment rules to prohibit any post-issuance amendments to the QOA 22. If either the Issuer 20 or the investors 28 are allowed to change one or more of the terms of the QOA 22 and/or rights of Investors 28 the rules for such changes are specified in the amendment rules. Such rules can include such provisions as: percentage of unit holders that must ratify any such change, procedures for voting on a proposed change, percentage of holders that are allowed to initiate a request for a change process (e.g., as described in more detail below).

9 QOA Validation and Approval

Referring back to FIG. 4, subsequent to the issuer authoring the QOA (72) and prior to the economic participation market 26 accepting newly issued segregated contract participation units 24 based on the QOA 22 (76), the economic participation market 26 manages a process for validating the QOA 22 (74). More particularly, before an Issuer 20 can officially register a QOA 22 in the economic participation market 26, the QOA must be validated by a review authority associated with the economic participation market 26. The review authority can be regulated or unregulated. The review authority reviews the QOA 22 and confirms that the QOA 22 is correctly structured and written before the QOA is officially registered and disseminated n the economic participation market 26.

Figure 6:
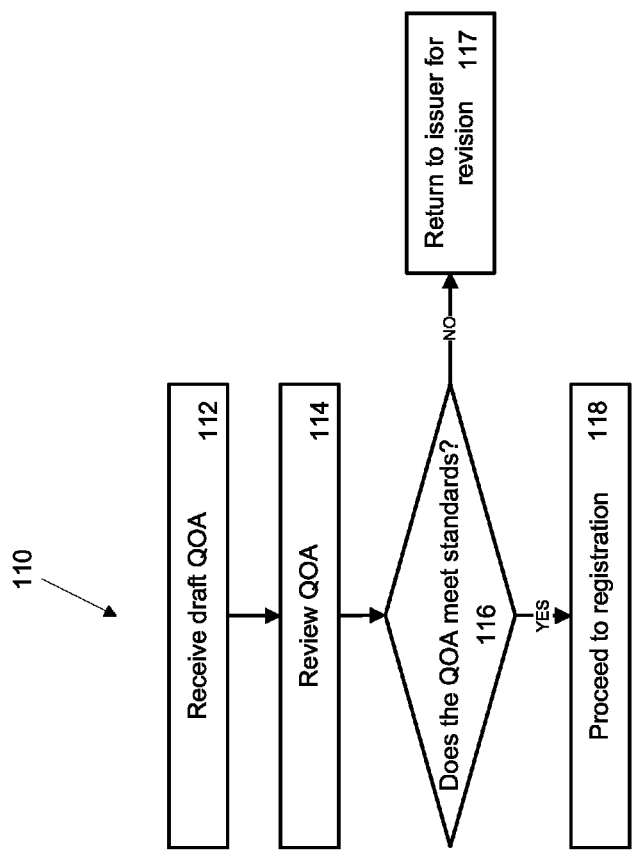
FIG. 6 is a flow chart of a QOA approval process.

FIG. 6 shows and exemplary a process 110 for validation and approval of the QOA 22. The economic participation market 26 receives a draft QOA 22 from the issuer 20 (112) and the review authority reviews the draft QOA (114). The review authority determines whether the QOA 22 meets standards outlined by the economic participation market 26 (116). For example, the review authority can determine if the format of the QOA 22 is correct and whether the QOA 22 adequately describes the rights and responsibilities of all parties to the contracts. If the review authority determines that the QOA 22 does not conform to the standards, the review authority returns the QOA 22 to the issuer 20 for revision (117). On the other hand, if the review authority determines that the QOA 22 does conform to the standards, the economic participation market 26 allows the QOA 22 to proceed to the registration process (118).

10 Registration of the QOA

Referring back to FIG. 4, subsequent to the issuer 20 authoring the QOA (72) and validating the QOA (74), the economic participation market 26 registers the QOA 22 on the economic participation market 26 (76).

Figure 7:
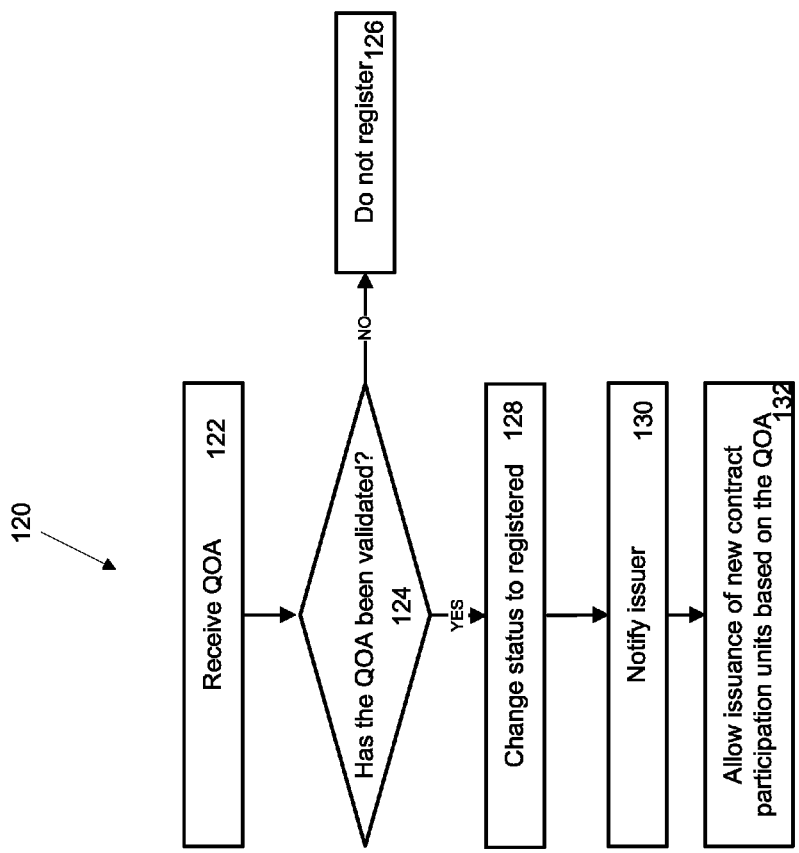
FIG. 7 is a flow chart of a QOA registration process.

FIG. 7 shows a process 120 for registering a QOA 22. Upon receipt of a QOA document (122), a register QOA workflow process within the economic participation market 26 determines whether the QOA 22 has been validated by the review authority (124). If the QOA 22 has not been validated, the economic participation market 26 does not register the QOA and communicates any errors back to the issuer 20. On the other hand, if the economic participation market 26 confirms that the QOA 22 is marked as having been validated by the Review Authority, the Register QOA workflow changes the QOA's status to "registered" (128) and communicates the status change to the Issuer 20 (130). Once a QOA 22 has a status of registered, the CPUs 24 defined therein are in a status of "registered—awaiting issuance". Once the QOAs 22 and the segregated contract participation unit agreements have a registered status, the economic participation market 26 allows issuance of new CPUs 24 by the issuer 20 based on the QOA 22 (132).

11 Approval, Registration, and Validation of Segregated Contract Participation Units Based on a QOA For each type of segregated contract participation unit that the issuer 20 desires to issue based on a qualified operating agreement, the issuer 20 generates and validates a segregated contract participation unit agreement for the segregated contract participation units to be issued. More particularly, before an Issuer 20 can officially register CPUs in the economic participation market 26, in addition to the QOA, a segregated contract participation unit agreement is also validated by a review authority. The approval and review of a CPU agreement can be either part of or separate from the approval and review of the QOA because multiple different CPUs can be generated based on a single QOA.

Figure 8:
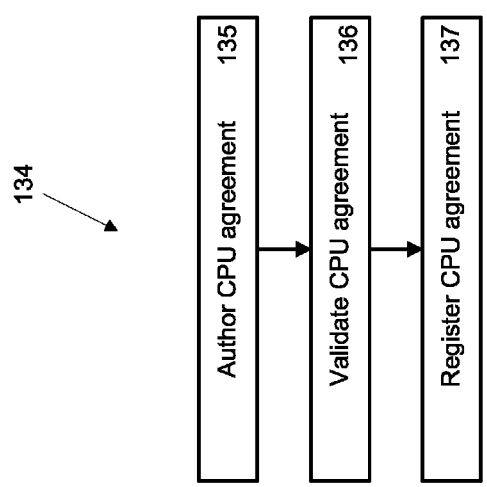
FIG. 8 is a flow chart of a CPU agreement generation process.

FIG. 8 shows and exemplary a process 134 for validation and approval of the segregated contract participation unit agreement. An issuer 20 authors the segregated contract participation unit agreement based on a QOA 22 (135) and prior to the economic participation market 26 accepting newly issued segregated contract participation units 24 based on the segregated contract participation unit agreement (137), the economic participation market 26 manages a process for validating the segregated contract participation unit agreement (136). More particularly, before an Issuer 20 can officially register the segregated contract participation unit agreement and issue segregated contract participation units based on the segregated contract participation unit agreement and associated QOA, the segregated contract participation unit agreement is validated by the review authority. The review authority reviews the segregated contract participation unit agreement and confirms that the segregated contract participation unit agreement is correctly structured and written before it is officially registered and disseminated.

For example, the economic participation market 26 receives a draft segregated contract participation unit agreement from the issuer 20 and the review authority reviews the draft segregated contract participation unit agreement. The review authority determines whether the segregated contract participation unit agreement meets standards outlined by the economic participation market 26. For example, the review authority can determine if the format of the segregated contract participation unit agreement is correct and whether the segregated contract participation unit agreement adequately describes the rights and responsibilities of all parties to the contracts. If the review authority determines that the segregated contract participation unit agreement does not conform to the standards, the review authority returns the segregated contract participation unit agreement to the issuer 20 for revision. On the other hand, if the review authority determines that the segregated contract participation unit agreement does conform to the standards, the economic participation market 26 allows the segregated contract participation unit agreement to proceed to a registration process after which the issuer 20 can issue segregated contract participation units based on the segregated contract participation unit agreement and associated QOA.

Figure 9:
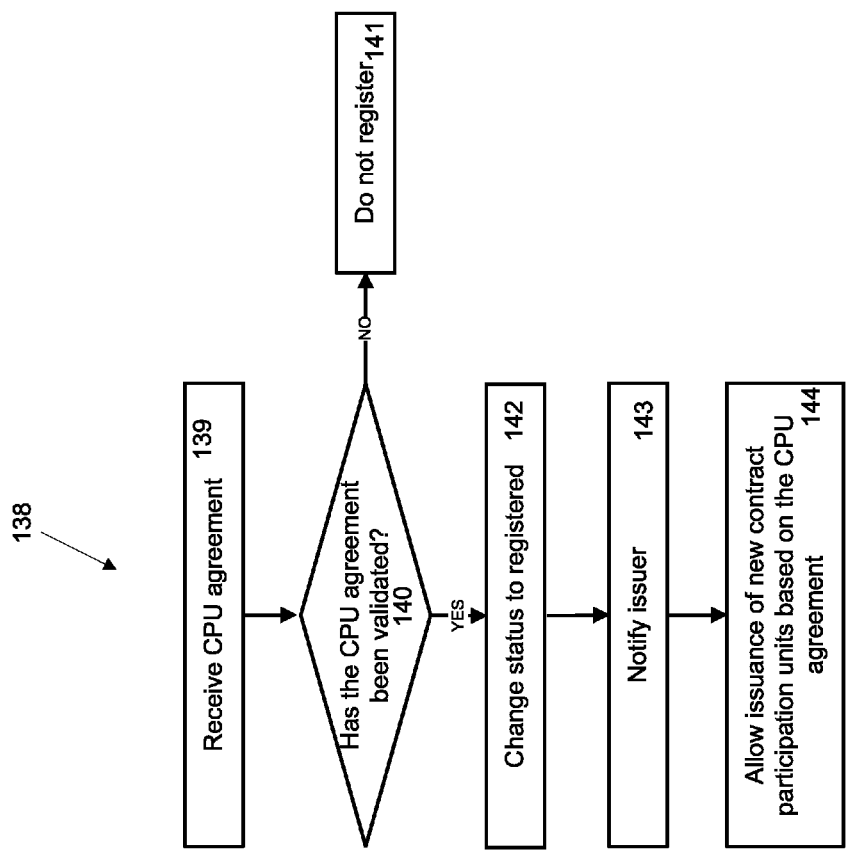
FIG. 9 is a flow chart of a CPU registration process.

FIG. 9 shows a process 138 for registering a CPU agreement. Upon receipt of a CPU agreement document (139), the participation market 26 determines whether the CPU agreement document has been validated by the review authority (140). If the CPU agreement document has not been validated, the economic participation market 26 does not register the CPU agreement document and communicates any errors back to the issuer 20 (141). On the other hand, if the economic participation market 26 confirms that the CPU agreement document is marked as having been validated by the Review Authority, the status of the CPU agreement is changed to "registered" (142) and the economic participation market 26 communicates the status change to the Issuer 20 (143). Once a CPU agreement document has a status of registered, the economic participation market 26 allows issuance of new CPUs 24 by the issuer 20 based on the QOA 22 and the CPU agreement (144).

12 Issuance and Sale of Segregated Contract Participation Units

Various individuals or entities associated with the economic participation market 26 can be involved in the issuance and sale of segregated contract participation units 24. After the economic participation market 26 registers a new QOA 22, the issuer 20 files a new issuance of CPUs 24 in the economic participation market 26. The economic participation market 26 can include electronic filing mechanisms to facilitate filing the issuance of the CPUs 24 by the issuer 20. The information provided in the filing includes a reference to the relevant QOA 22 and to the specific CPU Definition therein, a specification of any CPU Distributor(s) being used and a description of the means by which the CPUs will be sold. The electronic filing mechanism provided by the economic participation market 26 validates the filing by verifying that the QOA 22 and the CPU agreement being referenced have previously been registered in the network. The details of the filing will be made available on the economic participation market 26 to users with the appropriate permissions. As described in more detail below, the issuer 20 can use the economic participation market 26 to offer the issued segregated contract participation units 24 directly to individuals and entities on a primary sale or to Distributors who will sell them to qualified buyers.

Figure 10A:
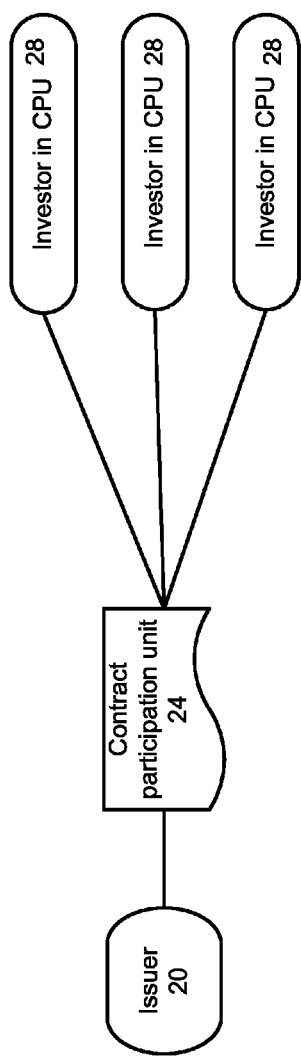
FIG. 10A is a diagram of a primary market.

13 Purchase of CPUs by Investor in Segregated Contract Participation Unit in a Primary Sale FIG. 10A shows a block diagram of the sale of CPUs 24 to an investor 28. In the primary sale, the issuer 20 sells segregated contract participation units 24 directly to the investor 28. The sale of the segregated contract participation units 24 to the investor 28 forms a contractual relationship between the investor 28 and the issuer 20.

For a direct sale, the issuer 20 may pay a commission to a representative. In addition, the issuer 20 may engage an approved CPU Transfer Agent to manage the creation of electronic certificates of ownership and transferal to investor in segregated contract participation units, and to communicate this information back to the issuers 20. The transfer agent can continue to function in this role for the life of the CPUs 24 or until replaced by another transfer agent. The transfer agent's primary responsibility is to manage the official registry of investors who own the CPUs. The transfer agent receives notification of all trades and manage the registry of ownership for the issuer 20.

In the direct market, electronic payment and escrow services can facilitate the physical transfer of money.

For sales of CPUs 24 on the direct market, an issuer 20 can offer a set of CPUs 24 to either an open universe of investors or to a private group that the issuer 20 specifies in the QOA 22. In order to manage the issuance process, the economic participation market 26 can include a distribution service that accepts and manages bids for CPUs 24 submitted by potential investor in segregated contract participation units. The issuer 20 will be able to continually monitor this "order book" data which will eventually result in actual primary sales. More sophisticated auction mechanisms can also be used.

14 Indirect Sale of CPUs to Investors

Figure 10B:
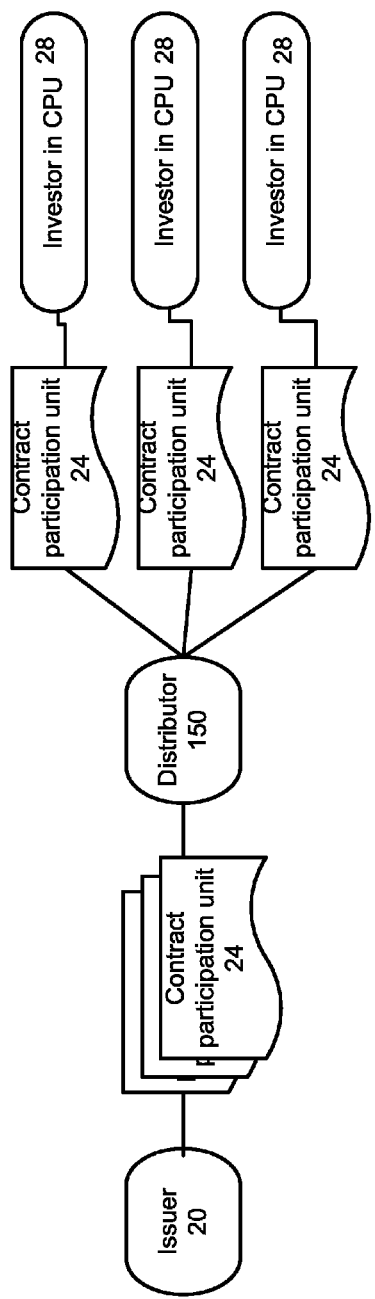
FIG. 10B is a diagram of a secondary market.

In addition to selling segregated contract participation units 24 directly to investors 28 on the primary market, the issuer 20 can also sell an interest in a segregated contract participation unit 24 to an investor 28 through third parties (referred to herein as dealers or distributors). FIG. 10B shows a block diagram of an indirect sale of CPUs 24 to an investor 28. The issuer 20 sells one or more segregated contract participation units to a distributor 150. The distributor 150 subsequently re-sells the segregated contract participation units 24 to an investor in the segregated contract participation units 28. As such, the investor 28 obtains the contact participation unit 24 from the third party (e.g., the distributor 150) rather than obtaining the segregated contract participation unit 24 directly from the issuer 20.

In some embodiments, a Distributor can work with the Issuer 20 to determine the initial price of the CPUs 24 it agrees to purchase, and then sells them to the investor 28. The price at which lots of the same set of CPUs are offered in an issuance can vary over time.

Investors 28 can use the distribution service tools on the economic participation market 26, to purchase CPUs 24. In some embodiments, electronic payment and escrow services along with Distributors will facilitate the physical transfer of money.

Both the issuer 20 and the distributors 150 can offer a set of CPUs 24 to either an open universe of investors or to a private group that is specified in the QOA 22.

The Issuer 20 and/or the distributor 150 can use a basic distribution service offered on the economic participation market 26 that accepts and manages bids submitted by potential investors. The issuer 20 and/or the agent 150 will be able to continually monitor this "order book" data which will eventually result in actual sales. More sophisticated auction mechanisms will also be offered as distribution services, and can be used by Distributors for sales involving third parties. When one or more Distributors are used, they will come to an agreement with the issuer 20 regarding the manner in which they sell the CPUs 24, including the degree to which they employ distribution services offered on the economic participation market versus using their own tools and processes.

15 Secondary Market Trading

Once an investor 28 has purchased a segregated contract participation unit 24 (either directly or indirectly), if desired, the investor 28 can re-sell the segregated contract participation unit 24 on a secondary market. Secondary Market Trading refers to the process by which the investors 28 and CPU Dealers buy and sell CPUs 24 that have already been issued. The value of the contact participation unit 24 on the secondary market is likely to fluctuate based on the performance of the underlying activiti(es) in which the segregated contract participation unit 24 offers participation. For example, if a segregated contract participation unit offers participation in a new model of car sold in North America by offering a portion of the proceeds from sales of the car and the initial sales of the car are greater than projected, then the value of the contract participation 24 is likely to increase. In contrast, if the initial sales are below expectation, the value of the segregated contract participation unit 24 is likely to decrease. In matching buy and sell orders for CPUs in the EPM only buy orders from qualified buyers (as per the QOA) are considered. The system can utilize different matching and auctioning techniques. Because of the contractual nature of the units traded, buying units implies undertaking contractual obligations towards the issuer (e.g. obligation not to disclose confidential issuer's information provided to unit holders as part of a restricted disclosure procedure.

16 Distribution of Proceeds

The distribution of proceeds refers to the process by which Issuers 20 distribute income, interest, dividends or any other proceeds to investors 28 holding CPUs 24 it has issued.

The Issuer 20 can distribute proceeds or it can employ a CPU Payment Agent to do so on its behalf. If a payment agent is used, the issuer 20 pays the Agent a fee. The actual distribution can occur over the economic participation market 26 via Payment and escrow services, or it can take place outside of the economic participation market 26. Regardless of how the payment is executed, the economic participation market 26 is notified of the transfer of moneys and maintains a record of the transfer.

17 Amendment of Qualified Operating Agreements

In some situations, the issuer 20, the investor 28, or both may desire to make a change or amendment to the qualified operating agreement 22 after the segregated contract participation units 24 have been issued based on an amendment procedure described in the qualified operating agreement 22. In general, when agreement is reached with regard to amendments (as described below), both general content as well as specific CPU definition sections of a QOA 22 can be amended. Such amendments can be either issuer-initiated or CPU holder-initiated.

Issuer-initiated amendments are amendments that the Issuer 20 wishes to make. For example, subject to rights provided to it in the QOA, the issuer 20 may desire to modify the disclosure requirements, redeem all or part of the entire issue, change the currency used in calculations or even change the economics of the CPUs within a predefined range Depending on the type of amendment and the amendment rules specified in the QOA 22, the issuer 20 may need to get a certain percentage of votes from Investors to allow it to legally make the amendment to the QOA 22. The exceptions to the vote requirement include amendment rights and amendment types that the issuer 20 clearly specified in the QOA 22 as not requiring a vote. For amendments requiring a vote of the investors 28, the issuer 20 must specify in the QOA 22 the percentage of votes that it will need to execute the change. Often such rules will be written to apply to a wide class of amendments. For example, an issuer 20 can write that for any amendment that would change the calculation methods used to calculate distribution of proceeds to Investors, it must get support from 80% of Investors. The economic participation market 26 can provide services that enable voting to be managed electronically.

Figure 11:
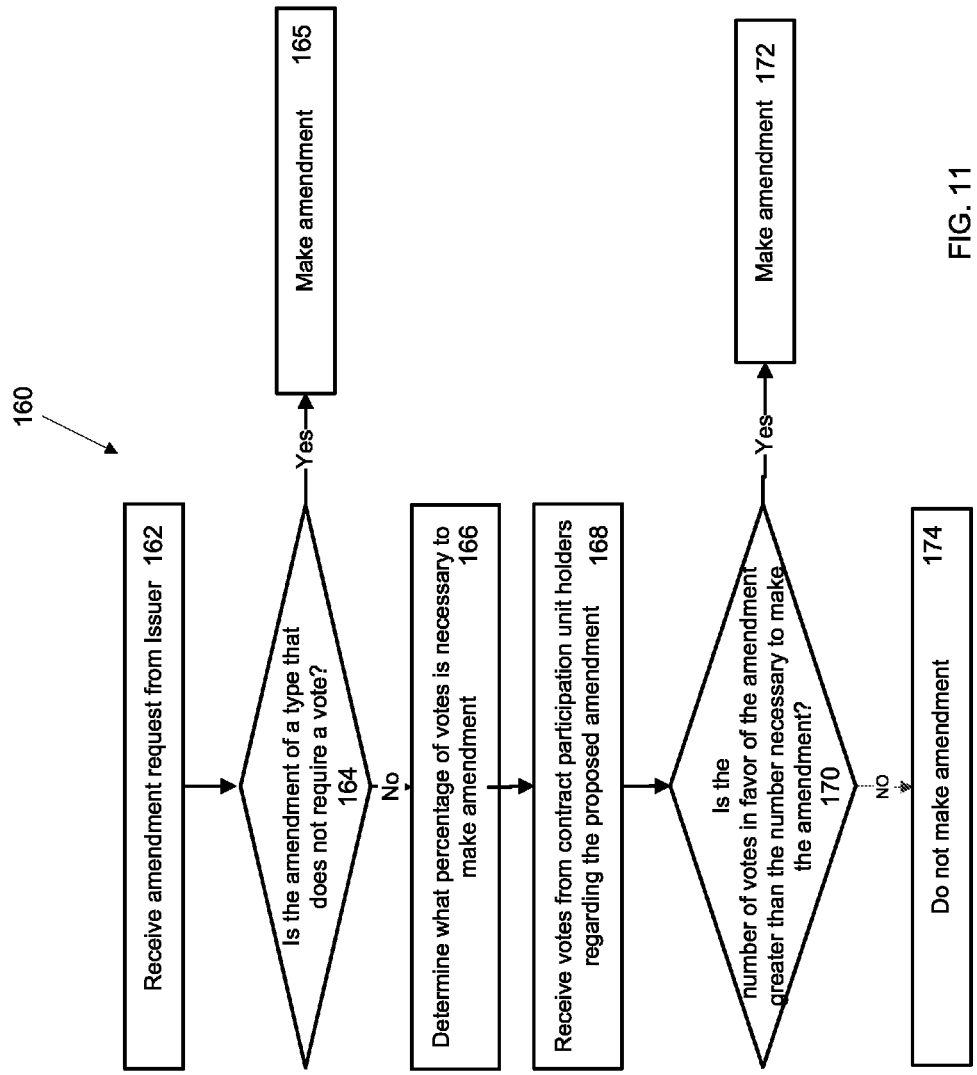
FIG. 11 is a flow chart of an amendment process.

FIG. 11 shows a process 160 for managing issuer-initiated amendments to a QOA 22. The economic participation market 26 receives an amendment request from the issuer 20 (162). Based on the type of amendment in the amendment request, the economic participation market 26 determines whether the amendment is of a type that requires a vote of the investors in order to implement the amendment (164). If the amendment is not of a type that requires a vote of the investors, the economic participation market 26 makes the amendment (165). On the other hand, if the amendment is of a type that requires a vote of the investors 28, the economic participation market 26 determines what percentage of votes is necessary to make the amendment (166). The percentage of votes necessary is specified in the qualified operating agreement 22. The economic participation market 26 requests and receives votes from investors 28 regarding the proposed amendment (168) and determines whether the number of votes in favor of the amendment is greater than the percentage required to implement the amendment (170). If the percentage is greater than or equal to the required percentage, the economic participation market makes the amendment (172). On the other hand, if the percentage is less than the required percentage, then the economic participation market 26 does not make the amendment and notifies both Issuer and Investors about the voting results . . . .

CPU holder-initiated amendments are amendments that originate with the Investors 28 of a set of CPUs. For example, an investor 28 may desire to exercise rights granted to the investors, elect an option to change performance calculations, replace the auditors (if allowed) etc Since amendments made and ratified by the investors 28 generate a legally binding obligation for the issuer 20, the issuer 20 may limit the type of amendments that can be made by the investor 28. For example, the issuer 20 buyer might not allow amendments to the calculation of proceeds by the investor in segregated contract participation units unless it was specifically allowed at the QOA or the CPU agreement. In addition to limitations on the type of amendments that can be made by the investors 28, in the Amendment Rules section of the QOA, the Issuer 20 specifies both a minimum percentage of holders needed for an amendment request to be put to a vote and the required percentage of positive votes for such an amendment request to actually become a legally binding obligation for both the issuer 20 and the investors 28. The issuer 20 can specify these for as many and as general or specific amendment types that it desires to allow.

Figure 12:
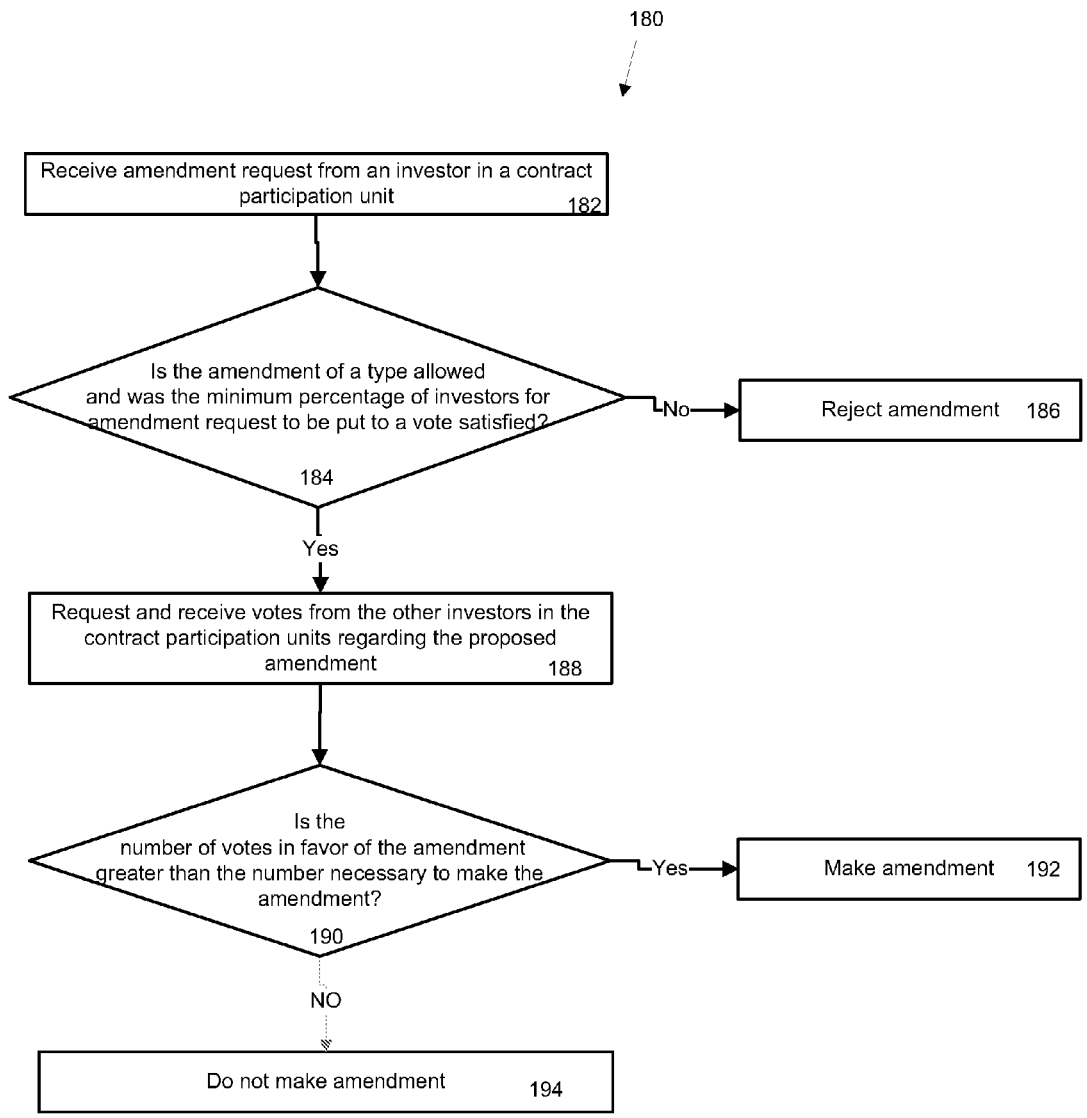
FIG. 12 is a flow chart of an amendment process.

FIG. 12 shows a process 180 for managing such issuer-initiated amendments. The economic participation market 26 receives an amendment request from one of the investors 28 (182). The economic participation market 26 determines whether the amendment is of a type that is allowed to be made by the investors 28 and whether the minimum percentage of investors for the amendment request have been satisfied (184). Both the type of amendments that can be initiated by an investor in the CPU and the minimum percentage of holders needed for an amendment request to be put to a vote are specified in the QOA 22 for the CPU 24. For example, prior to requesting an amendment, the investor in the CPUs who desires to initiate the amendment can solicit signatures from other investors. The proposed amendment will be presented generally for a vote only if a large enough proportion of the investors support proposing the amendment. If the amendment is not of a type that is allowed to be made by the investors 28 or if the minimum percentage of holders needed for an amendment request to be put to a vote is not obtained, the economic participation market 26 rejects the amendment (186). On the other hand, if the amendment is of a type that is allowed to be made by the investors 28 and minimum percentage of holders needed for an amendment request to be put to a vote is obtained prior to submission of the request, the economic participation market 26 requests and receives votes from the investors who currently hold the segregated contract participation units (188) and determines whether the number (e.g., the percentage) of votes were received in support of the amendment was big enough to support the amendment (190). If enough votes supporting the amendment were not received, the economic participation market 26 rejects the amendment (194). If enough votes were received in support of the amendment, the economic participation market 26 implements the amendment (196) and the amendment becomes a legally binding obligation for the issuer 20 and investor 28.

18 Withdraw Qualified Operating Agreement

In some situations, issuers 20 can withdraw a QOA 22 after it has been registered and CPUs 24 have already been issued. For example, an issuer 20 could desire to withdraw a QOA 22 if its financial situation changed, it was not able to sell enough CPUs, other more attractive financing options are available, etc. However, prior to withdrawing the QOA 22, the Issuer 20 buys back all CPUs 24 connected to the QOA 22 that are still being traded in the economic participation market 26. It is possible to include in the QOA 22 a PUT price in which the issuer is allowed to buy part or all of the outstanding units.

Such redemptions can require a positive vote from a certain minimum percentage of Investors and a preset method and/or set of formulae for valuing the CPUs 24. In order to protect investors in the segregated contract participation units, if the Issuer 20 does not specify both of these in the QOA 22, the issuer 20 will not be allowed to force a buy back of CPUs 24.

Figure 13:
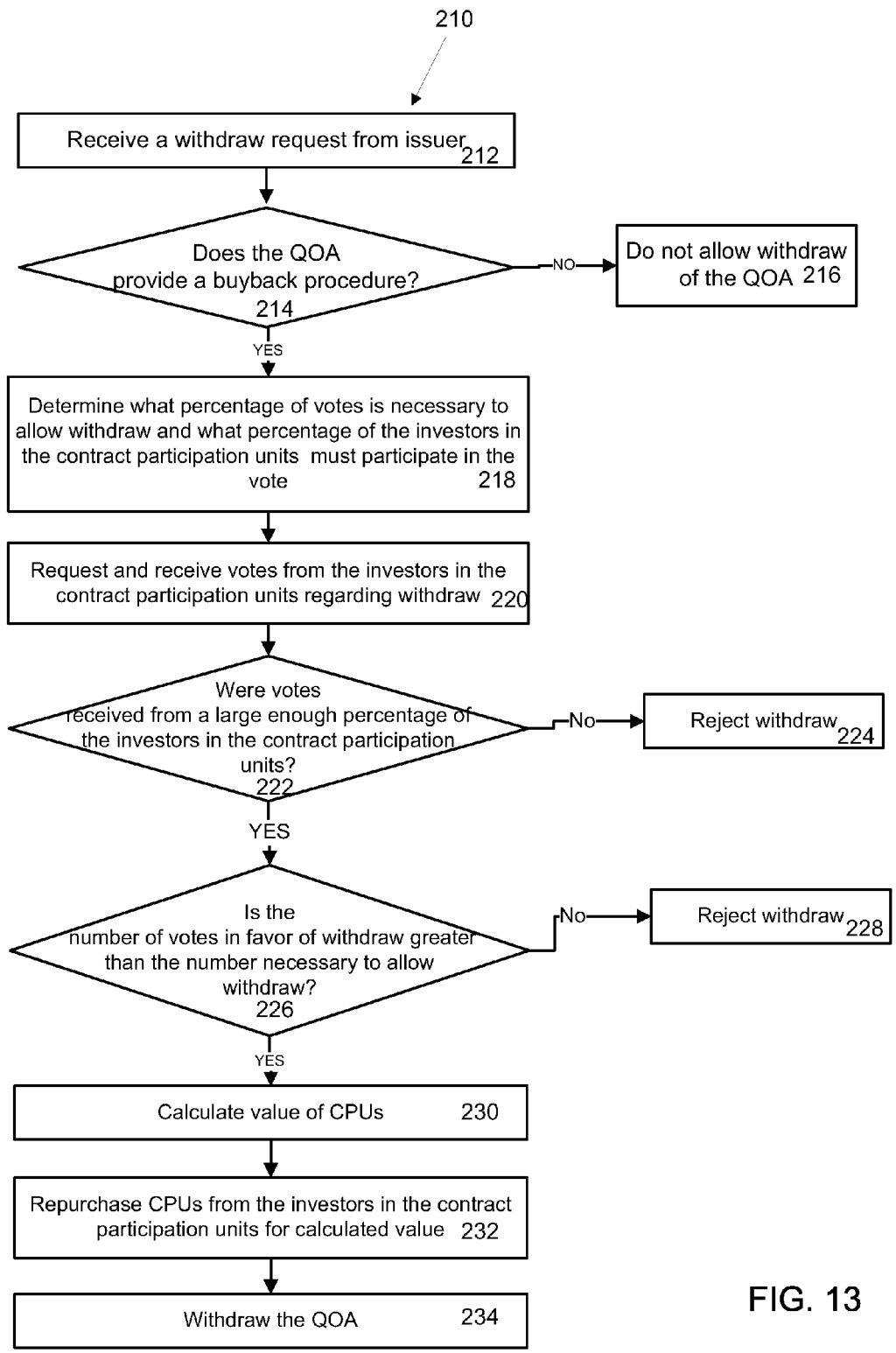
FIG. 13 is a flow chart of a withdraw process.

FIG. 13 shows a process 210 for withdrawal of a QOA 22. The economic participation market 26 receives a request to withdraw the QOA 22 from the issuer 20 (212) and determines whether the QOA 22 specifies a buyback and withdrawal procedure (214). If the QOA 22 does not provide such terms, then the economic participation market 26 denies the withdrawal of the QOA 22 (216). If the QOA 22 does provide a buyback procedure, the economic participation market 26 determines what percentage of votes is necessary to allow the withdrawal and what percentage of the investors must participate in the vote (218). The percentage of votes necessary and the percentage of investors required are specified in the qualified operating agreement 22. The economic participation market 26 also requests and receives votes from segregated contract participation unit holders regarding the proposed withdrawal (220) and determines whether votes were received from a large enough portion of the investors 28 (222). If votes were not received from a large enough portion of the investors 28, the economic participation market 26 rejects the withdrawal request (224). If votes were received from a large enough portion of the investors 28, the economic participation market 26 determines if the number of votes in favor of the withdrawal is greater than the percentage required to allow the withdrawal (226). If the percentage is less than the required percentage, then the economic participation market 26 rejects the withdrawal and the CPUs 24 remain as legally binding agreements between the segregated contract participation unit holders and the issuer 20 (228). On the other hand, if the percentage is greater than or equal to the required percentage, the economic participation market 26 calculates the value of the CPUs 24 (230). The value is calculated according to a pre-defined formula included in the qualified operating agreement 22. After calculating the value for the CPUs 24, the issuer 20 repurchases the CPUs 24 from the investors 28 at the calculated value (232) and withdraws the QOA 22 from the economic participation market 26 (234).

19 Disclosure

Issuers 20 file disclosures based on the details they provide in the Disclosure Procedure and Timing section of the QOA 22. The filing can be electronic; the economic participation market 26 can include a mechanism that accepts submittals of disclosure documents from registered Issuers 20 and broadcasts them to Investors 28, all of whom are registered in the economic participation market 26. The EPM will also have a mechanism that will send alerts to issuers 20 in the days/weeks leading up to scheduled disclosure dates, and will provide exception handling functionality for missed deadlines.

20 Participation Based on Non-Monetary Contribution

Figure 14:
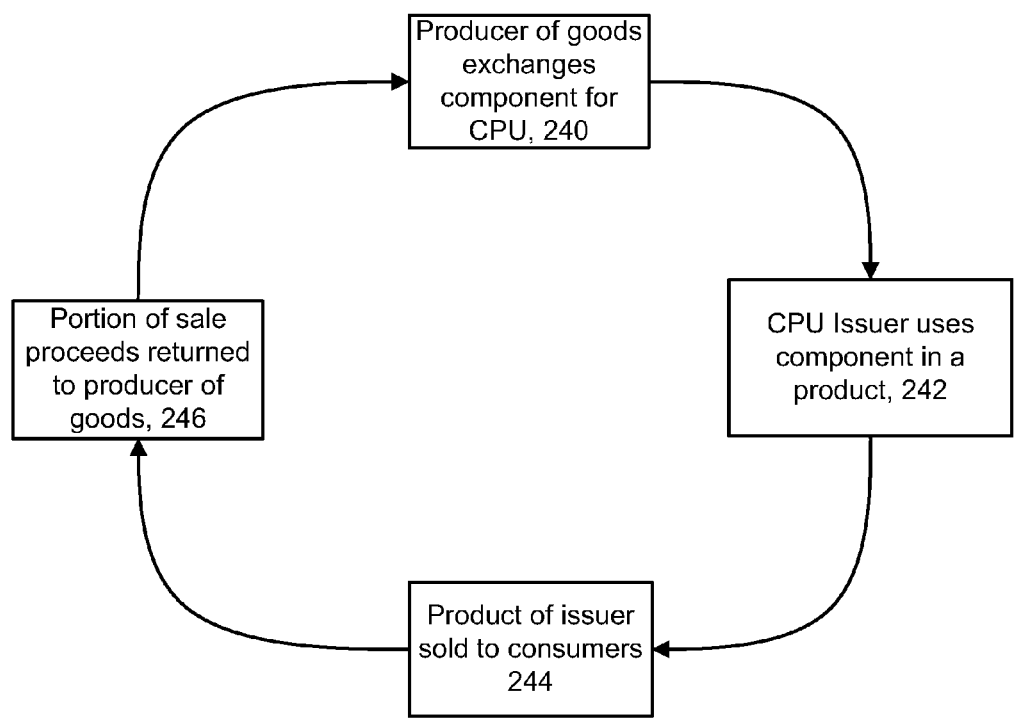
FIG. 14 is a diagram of a process involving non-monetary based CPUs.

As mentioned above, in some embodiments, the investor 28 can purchase participation by a non-monetary contribution of goods or services. FIG. 14 provides an example of an arrangement where participation is based on a non-monetary contribution. In such an arrangement, a producer of goods exchanges a component or service for participation in an activity of a manufacturer or company that will use the component or service (as shown in block 240). The participation is issued in the form of a CPU 24 that outlines the responsibilities of the manufacturer or company. The manufacturer or company that issued the CPU 24 then incorporates the component into a product (as shown in block 242) and the product is sold to consumers (as shown in block 244). Based on the terms outlined in the CPU 24, a portion of the proceeds from the sale of the product into which the component was incorporated is returned to the producer of the goods (as shown in block 246).

It is believed that allowing a producer of a component to purchase participation in the product into which the component is to be incorporated can re-allocate the risk for the producer of the product. For example, if a component is expensive and the producer of the product is unsure whether a product incorporating the component will be successful, the producer of the product can offer participation to the producer of the component such that the producer of the component shares in the risk of whether the product incorporating the component will be successful. It is believed that such a decoupling of the chain of title from the risk can make higher risk projects and products more feasible.

Figure 15:
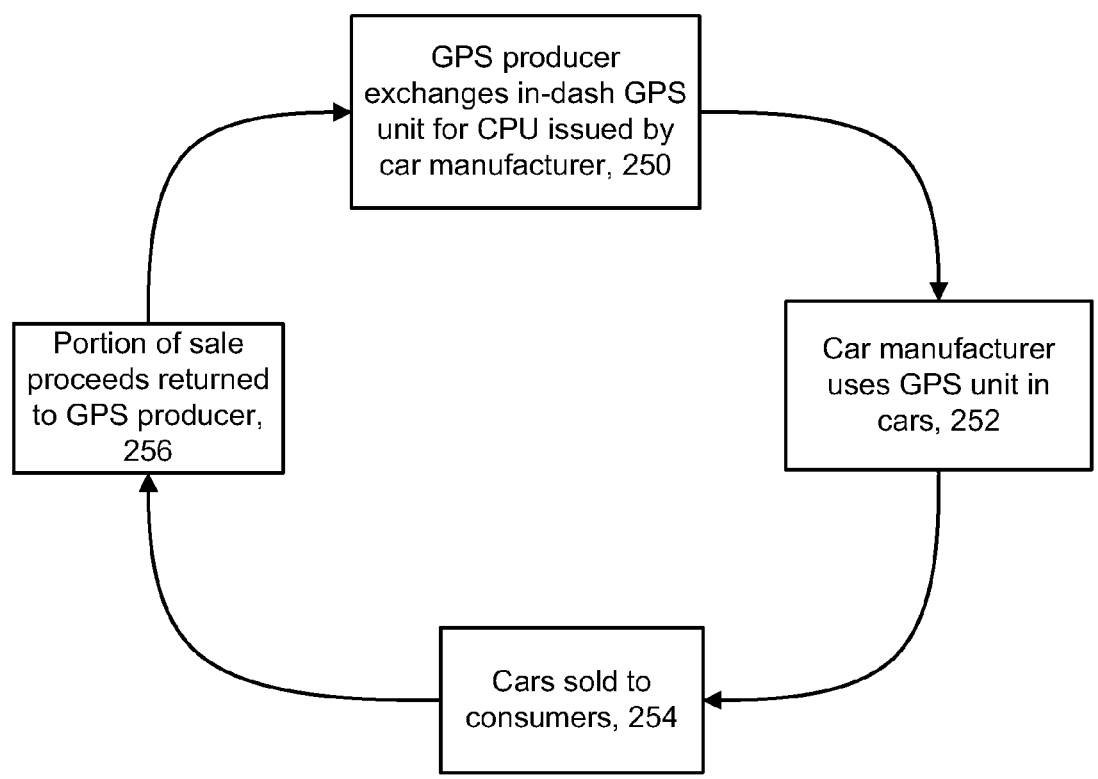
FIG. 15 is a diagram of a process involving non-monetary based CPUs.

For example, as shown in FIG. 15, a car manufacturer could be debating the decision of whether to include an in-dash global positioning system (GPS) in a car due to the cost of such a component. In order to share the risk of the decision with the producer of the GPS system, the GPS producer could exchange the in-dash GPS systems for a CPU issued by the car manufacturer (as shown in block 250). For example, the CPU could provide a discounted purchase price plus a return based on a percentage of the profits for cars incorporating the component. The car manufacturer could then incorporate the GPS systems into the cars (as shown in block 252) without having to pay the high up-front cost of the GPS systems. The cars that have the GPS system incorporated into them are then sold to consumers (as shown in block 254) and a portion of the proceeds from the sale are returned to the GPS producer (as shown in block 256) based on the terms in the CPU.

21 Sponsored and Individual Participants

The approaches described above are applicable to formation of a wide range of contractual relationships between a holder of rights or other assets and acquirers of rights and liabilities associated with such assets based on segregated asset participation units. Such parties to the contractual relationships can equally be individuals or business entities in any combination. Furthermore, in some circumstances, the terms of the contractual relation are defined by a sponsor who defines the terms and in some instances provides or arranges for services that are referenced in the contractual terms. The sponsor is generally, but not necessarily, an entity that is distinct from the parties between whom the contractual relationships are formed. In some examples, a set of sponsors may each provide different terms, and a single sponsor may provide a set of different terms, thereby allowing parties to select the terms that best suit their needs.

In some examples, the techniques include offering by the holder of the asset to a set of potential parties on an electronic exchange a segregated asset participation unit to acquire a contractual participation interest including future rights and obligations associated with the underlying asset, and upon acquisition of the segregated asset participation unit by a specific acquirer of a set of potential acquirers establishing a contractual relationships between the issuer and the specific acquirer that binds the issuer and the acquirer to execute a set of obligations according to terms specified in the segregated asset participation unit. The techniques allow individuals and entities to enter through the use of an electronic exchange into segregated contractual relationships with a set of investors/acquirers under which the individual issuer transfers part of specific assets and/or rights in return for money (immediate and/or future payment(s)) and/or other commitment(s) from each of the investors.

The techniques can be implemented by a personal assets sharing system that includes software to assist with creation and issuance, administration, redemption, and trading of segregated asset participation units. In one embodiment, the software of the personal assets sharing system is similar to the software of computer system 10 described above. In view of the similarities of participating in an activity and sharing of an asset, the terms "participating agreement" and "sharing agreement", and related terms, are used interchangeably.

The techniques described in this document can be used for facilitating many types of transactions. Examples of such transactions include:

A method for originating and managing a new type of reverse mortgage contracts and financing.

A method for selling an interest in an existing life insurance policy.

A method of selling an interest in a financial structure owned by a person.

A method of selling a partial right to use one's asset (e.g. a yacht, a vacation home, a subscription, a membership etc.).

The personal assets sharing system can include one or more of the following processes and capabilities:

1. An Issuer can register an Asset Sharing Agreement (ASA) which is a Qualified Operating Agreement that describes the underlying asset or rights that are going to be shared, the terms under which the asset is offered, the price and the liabilities that the purchasers of the units are undertaking, the operating aspects of collecting and distributing monies according to the agreement, the methods for handling conflicts, delinquencies and disputes under the agreement, etc. The Asset Sharing Agreement can be a predefined type of agreement from a pre-set library or a newly define format.
2. The information included in a registered ASA is verified by an independent service that adds to it an assessed value for the asset (e.g. value of a real estate asset) and verified parameters related to the asset (e.g. annual taxes, age of the seller, current sublet revenues, credit rating of the payer in a financial structure etc.) and various ratings (e.g. type of neighborhood).
3. The Asset Participation Units (APUs) are a type of Contract Participation Units. They specify the specific rights and liabilities that the subscriber to the unit undertakes. In addition to the original purchase price to be paid by the investor it may also include an obligation to pay additional sums in the future (e.g. pay its share of the monthly premium to be paid for a share of the issuer's insurance policy or a monthly payment to the issuer of a reverse mortgage ASA).
4. There is a possibility of registering the ASA and the APUs as one registration transaction.
5. The Economic Participation Market (EPM) allows both primary selling and secondary trading of APUs. The matching of buyers and sellers will be done based on one or more parameters (e.g. IRR, monthly payment, term etc.). Secondary sale of an APU is equivalent to the assignment of the underlying rights and obligations from the selling investor to the buying investor.
6. The administration services provided by the system include the collection and distribution of monies both from the holders of ALUs to the issuer and from the issuer (or on his behalf) to the unit holders.
7. The EPM will allow a seller to place trading orders for baskets of many individual ALUs held in different assets with similar rating or characteristics. Similarly buyers could place an order for a basket of ALUs and specify how to diversify the basket they are willing to buy according to specific characteristics (e.g. "buy 100 ALUs of $1000 each in 100 different cities where the issuer's equity is not less than 50% of the current assessment).
8. The ASA and the ALUs will specify remedies for defaults (e.g. a unit holder that fails to pay his monthly payment might pay a penalty or alternatively lose his interest and the contact between him and the issuer be terminated).
9. In some cases a third party may provide an actuarial rating that will be added to the ALU information without revealing the underlying information (e.g. medical data) that led to the rating.
10. The System manages the registration process of APUs and APAs including the routing to third parties and publishing statuses and rating collected along the way.
11. The system also administers the billing and collecting the fees for services rendered by third parties and by the system itself.

Examples for possible cases can be outlined as follows:
a. Reverse Mortgage with defined term: The issuer sells 100 units. Each unit holder pays $1000 up front plus $50 a month for a period of 10 years. At the end of ten years the house is going to be sold and the unit holder will receive his investment plus interest calculated providing x % internal rate of return (IRR). Trading the unit will be based on the IRR.
b. Whole Life Reverse Mortgage. The unit holder will pay the issuer a quarterly amount of $100 and in return will receive 1% of the net value of the house when it is sold after the issuer passes (or alternatively after both owners pass).
c. Life Insurance sharing—example one: The unit holder will pay $1000 upfront plus the 1% of the annual premium for an outstanding life insurance policy and in return will receive 1% of the distribution when the issuer passes.
d. Life Insurance sharing—example two: The unit holder will pay 1% of the annual premium for an outstanding life insurance policy and in return will receive 0.5% of the distribution when the issuer passes.

In a number of the examples described in this document, the issuer prepares a Qualified Operating Agreement (QOA) or an Asset Sharing Agreement (ASA), which is then registered in an exchange. Note that in general, the role of preparing and/or registering a QOA or ASA may be decoupled from the issuer. In particular, an entity (or individual) can take on a role of a "sponsor" (or "broker") who registers such an agreement, and makes it available for selective use by an issuer. In some cases, the sponsor is involved in the performance of the terms of a contract between two parties according to their registered agreement, for instance, in one or more roles, which can include monitoring, auditing, servicing, or otherwise facilitating the performance. In some cases, the sponsor establishes agreements with other parties to perform such functions. In some examples, the sponsor has an interest in the contact, or example, being paid a service fee, commission, or other form of compensation for providing the Agreement and/or participating in the performance. In some cases, the sponsor may take a further role in a contractual relationship between parties, for example, functioning in a subsidizer role in which they may take some risk in the transaction in exchange for value derived from the transaction.

An example of a scenario for a person selling participation in his life insurance policy, in which one or more sponsors are involved, is described below:

One or more sponsors put together Asset Sharing Agreements ASA) and associated Asset Sharing Units (ASUs) for the use of third party individuals selling participation in insurance policies they own.

The ASA and the ASU are going through authoring validation and registration with an EPM. The ASA includes validation procedures for each individual policy holder that would like to issue ASUs participation units in his policy based on this specific ASA. Such validation may include validation of the terms and the status of the policy, a medical test, receipt of underwriting information from life insurers etc.

The ASA can further include the terms and conditions of agreements with service providers who become part of the agreement represented by each ASU.

Once reviewed, validated and registered the ASA and corresponding ASUs are published by the Electronic Participation Market (EPM) and are available for individual issuers and interested investors.

A subscribing individual who wants to sell participation in his Policy can now review the outstanding library of ASAs and see what the various options available to him are. He can now choose a particular ASA and register with the EPM n ASUs under such ASA.

This choice can have the following meaning: I provide all the necessary information about myself and my insurance policy as specified in the ASA; this information will be verified by service provider x who will guarantee the accuracy of the information; I am going to sell 50 participation units to subscribers of the EPM; each acquirer of a unit is entering an agreement with me and with the service providers associated with this ASA; under such agreement each subscriber will pay 1000 up front plus $100 every January until I die; upon my death the unit holder will receive his investment plus irr % interest (or alternatively p % of the amount of my policy); A facilitator is a party to each unit subscribed and he commits to terms specified in the ASA that could include for instance an agreement to collect the money; take m % for itself as management fee and transfer the balance to the issuer; verify and guarantee the information provided. The ASA might specify that if any subscriber fails to pay the annual payment he will forgo his rights and the facilitator will step in and undertake the obligation to continue to pay the annual amounts in return for all the rights provided by the unit.

The issuer can now offer m out of the n registered ASUs for trading at a given value. The value can be IIR or price or any other variable.

The EPM will now match the issued ASUs (that have type and other qualifying parameter) with subscribers who are interested in this kind of units on the basis of the value of the matching variable.

A subscriber can subscribe to a 1000 ASUs of a requested type of ASA and a set of qualifying parameters (age, underwriting parameters, geographic location, total amount of the policy etc.). The EPM will try to allocate 1000 units from 1000 different issuers and allow the facilitator to manage all the units as one transaction creating a transparency and operational efficiency.

The EPM maintains both a primary and secondary market for ASUs and can satisfy trading requests from both new (primary) issuers as well as secondary sellers of outstanding units they bought before.

In this particular type of Assets Sharing we expect facilitators to be creative and author different kind of standardized ASAs that could address multiple levels of risks costs and rewards.

We further expect this system to create many new attractive options for individuals who are forced to sell interest in their assets and dramatically reduce the cost of such transactions while providing good returns and liquidity to those who elect to invest in these markets It should be understood that in some examples, there are several stages to the formation of the contracts and subsequent performance by the parties to the contract. These stages include: Registration; Selection; Entry; Match; and Performance.

In the Registration stage, multiple different ASA, QOA, or other master agreement are registered with the exchange. Note that here, the term registration should be understood broadly to include any sort of identification of the agreements such that potential parties to the contractual relationships may be made aware of the agreements. In general, the agreements include some specific terms, and some parameters that can be specific to the individual contract. Such parameters can include features such as term, interest rate, geographic location, individual's age etc.

In some embodiments, the master agreements include identifications of a set of third parties that are to have roles (i.e., to form contractual relationships) with one or more parties to the contracts that are formed according to the master agreements. An example of such a third party can include a party responsible for collecting and distributing funds between the parties. Another example is a party that is to perform validation services for parties that wish to establish relationships under the agreement. For example, an auditor may be responsible for establish and vouching for the value of an asset. In general, the sponsor preestablishes these third party relationships prior to the registration with the exchange.

As outlined above, this registration can and in certain implementations generally will happened before any parties offer to participate in the contractual relationships. Generally, the master agreement defines roles of two or more classes of parties. For example, an agreement may define an issuer role and a purchaser role. In the case of a reverse mortgage, one role may be a property owner role and a second role may be a purchaser role. An example in which there may be more than three roles is when there is an issuer role, a purchaser role, and a sponsor role.

The Entry stage generally has a number of sub-stages. When a party wishes to participate in the exchange under a particular master agreement according to particular parameters set forth in the agreement, in a first Entry sub-stage, which we refer to as the Validate sub-stage, the party wishing to participate undergoes validation steps that in general are specified by the master agreement, and may involve the services of third parties specified in the agreement. Furthermore, the party may have to pay for some of those services as specified by the agreement. For example, the party may have to pay for an audit, title search, physical exam, etc. by a service provider specified in the agreement. Once all require pre-matching validation steps (if any) are performed successfully, the party is eligible to participate on the exchange under that agreement.

In another sub-stage of the Entry stage, which we refer to as the Posting sub-stage, the party provides makes the potential contracts available. N.ote that a party may withdraw a posted offer or change the parameters (e.g., price etc.) of the offer (which may results in further validation in some cases).

In the Matching stage, matches are made between parties that have provided data to the exchange indicating that they wish to form contractual relationships according to a particular master agreement and in a particular role (e.g., issuer) associated with that agreement. That is, the matches are made between parties that have posted their offers to participate. As outlined above, generally, before the parties are qualified to enter into the contracts, they are validated as qualified parties in a manner prescribed by the master agreement. For example, a party that is selling shares in a life insurance policy may have to provide evidence of that policy being in effect.

Matches are made after suitable parties have provided their offers to participate to the exchange, and the parameters of their offers are consistent so that the contracts can be automatically formed. For example, in some situations, a purchaser may offer to participate according to a particular master agreement before issuer offers to participate. Later when a suitable issuer offers to participate, the match causes the contact to be formed.

In some examples of offers posted by a party, there is a requirement of a particular degree of subscription that is required before a match is formed. For example, a party offering shares in a reverse mortgage may require that at least 80% and not more than 100% of the value of the property is matched before the contracts are formed in a single atomic operation. Such requirements share similar characteristics to group buying paradigms in which a offer is continent on there being a suitable degree of subscription.

The Matching stage results in the formation of the contracts, each of which in general may include two or more parties who have posted offers to participate in their respective roles, and may involve forms of contractual relationships between one or more of such parties and third parties (i.e., service providers) identified in the master agreement. Therefore each participation unit forms a contact between two or more, and more generally, three or more parties. These contracts that are matched, which can involve a large number of individual participation unit contracts, are matched in an atomic manner such that other offers are not posted or withdrawn while the contacts are being formed.

In some implementations, a party considering participating according to a particular in the exchange may use an automated service that compares the terms of various master agreements, or the characteristics of pending offers to participate according to such master agreements. Information provided by such a service may inform that party regarding whether and with what parameters or in what roles that party will offer to participate on the exchange.

The Performance stage follows immediately after the end of the Matching stage. Note that performance on the contact units may include a post-formation validation that is required under the master agreement. For example, rather than validating an aspect of a party's offer prior to matching, the master agreement may specify that a form of validation must be completed within a set time period after formation, and if such validation is unsuccessful, the contract is terminated.

More typically, validation has taken place before matching, and performance involves the required asset and funds exchanges between the parties to the contracts. As introduced above, the third parties specified by the master agreements have contractual relationships with the other parties as specified by the master agreement and are integral to the performance under the contact.

It should be understood that the description above focuses on the initial offering of the contractual participation unit. However, a secondary market similarly exists. In such a case, parties post their offers to trade (e.g., assign) the contractual rights and obligations under particular master agreements and with particular parameters, and matches are made in this secondary market in a manner similar to that in the initial offering. In some examples, a party wishing to have contacts assigned to them may have to be validated as in an initial offering, to determine if they are a suitable assignee of the contract to step into the place of the prior party in a role in that contract.

22 Implementations

Figure 16:
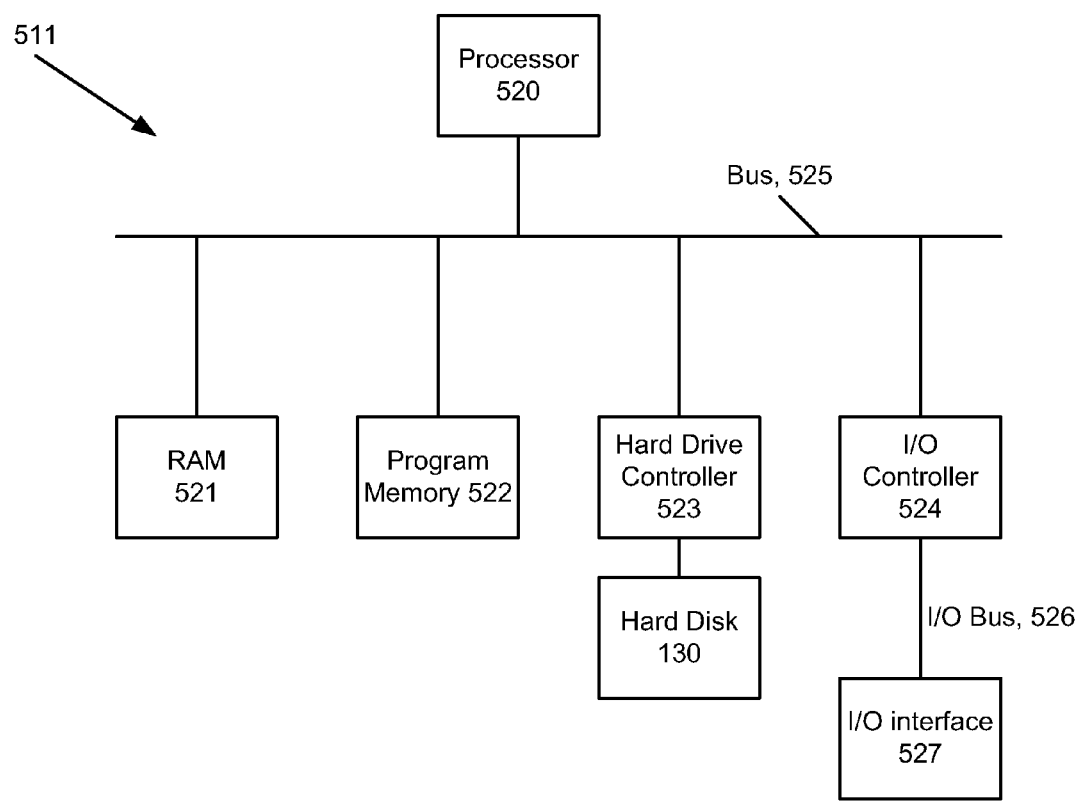
FIG. 16 is a block diagram of a computer system.

The system and methods used to implement the economic participation market described herein can be implemented in digital electronic circuitry, or in computer hardware, firmware, software, or in combinations thereof. For example, calculations of the value for a segregated contract participation unit, the formation of a qualified operating agreement, formation of segregated contract participation units, the settlement processes for segregated contract participation units, etc. can occur in systems 511 as shown in FIG. 16. Generation of qualified operating agreements and segregated contract participation units can be implemented using any technique. Also, data structures used to represent contents of the qualified operating agreements and segregated contract participation units can be stored in memory and in persistence storage. The segregated contract participation units can be represented by certificates or preferably as book entries in the records of an administrator or broker/dealer or clearing house or transfer agent or registrar either as manual entries or preferably as data structures in an administrator or a broker/dealer's computer systems.

Apparatus of the invention can be implemented in a computer program product tangibly embodied in a machine-readable storage device for execution by a programmable processor and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired, and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files, such devices include magnetic disks, such as internal hard disks and removable disks magneto-optical disks and optical disks. Storage devices suitable for tangibly embodying computer program instructions and data include all forms of non-volatile memory, including, by way of example, semiconductor memory devices, such as EPROM, EEPROM, and flash memory devices; magnetic disks such as, internal hard disks and removable disks; magneto-optical disks; and CD_ROM disks. Any of the foregoing can be supplemented by, or incorporated in, ASICs (application-specific integrated circuits).

An example of one such type of computer is shown in FIG. 16, which shows a block diagram of a programmable processing system (system) 511 suitable for implementing or performing the apparatus or methods described herein. The system 511 includes a processor 520, a random access memory (RAM) 521, a program memory 522 (for example, a writeable read-only memory (ROM) such as a flash ROM), a hard drive controller 523, and an input/output (I/O) controller 524 coupled by a processor (CPU) bus 525. The system 511 can be preprogrammed, in ROM, for example, or it can be programmed (and reprogrammed) by loading a program from another source (for example, from a floppy disk, a CD-ROM, or another computer).

The hard drive controller 523 is coupled to a hard disk 130 suitable for storing executable computer programs, including programs embodying the present invention, and data including storage. The I/O controller 524 is coupled by an I/O bus 526 to an I/O interface 527. The I/O interface 527 receives and transmits data in analog or digital form over communication links such as a serial link, local area network, wireless link, and parallel link.

It is to be understood that the foregoing description is intended to illustrate and not to limit the scope of the invention, which is defined by the scope of the appended claims. Other embodiments are within the scope of the following claims.

What is claimed is:

1. A computer-implemented method for establishing a contractual relationship between two parties based on a segregated contract unit, comprising:

accepting a registration of a plurality of participation agreements on an electronic exchange;

accepting on the electronic exchange from a first party of a first set of parties data characterizing an offer by the first party to form a first plurality of contract units according to a first participation agreement of the plurality of participation agreements in a first role associated with said agreement, each participation agreement specifying a plurality of roles for parties forming contractual relationships according to said agreement;

accepting on the electronic exchange from a second party of a second set of parties data characterizing an offer by the second party to form a second plurality of contract units according to a first participation agreement of the plurality of participation agreements in a second role associated with said agreement;

matching offers by parties to form contact units according to the first participating agreement in corresponding roles, including determining whether the data characterizing said offers by said parties represent compatible offers, including determining whether the offer by the first party is compatible with the offer by the second party; and upon matching compatible offers between parties in respective roles associated with the first participation agreement establishing direct contractual relationships between said parties, including establishing a contractual relationship between the first party and the second party that binds the said parties to execute a set of obligations according to terms specified in the first participation agreement.

2. The computer-implemented method of claim 1 wherein at least one of the first party and the second party comprises an individual.

3. The computer-implemented method of claim 1 wherein roles associated with the first participation agreement include an issuer role and a purchaser role.

4. The computer-implemented method of claim 1 wherein at least one of the first party and the second party comprises a company.

5. The computer-implemented method of claim 1 further comprising accepting a registration the plurality of participation agreements.

6. The computer-implemented method of claim 5 wherein accepting the registration of the plurality of participation agreements comprises accepting a registration of the first participation agreement, on the electronic exchange, from a sponsor that is distinct from the first set of parties and the second set of parties.

7. The computer-implemented method of claim 6 wherein the sponsor is bound to perform a role including at least one of monitoring, auditing, and servicing the contractual relationship between the offering party and the accepting party.

8. The computer-implemented method of claim 1, wherein the first plurality of contract units is associated with at least one of an activity, asset, or project related to a product or service of the offering party.

9. The computer-implemented method of claim 1, wherein the first plurality of contract units is associated with at least one of a life insurance policy and a financial structure owned by the offering party.

* * * * *